(12) United States Patent
Diaconu et al.

(10) Patent No.: US 11,473,935 B1
(45) Date of Patent: Oct. 18, 2022

(54) SYSTEM AND RELATED TECHNIQUES THAT PROVIDE AN ANGLE SENSOR FOR SENSING AN ANGLE OF ROTATION OF A FERROMAGNETIC SCREW

(71) Applicant: Allegro MicroSystems, LLC, Manchester, NH (US)

(72) Inventors: Aurelian Diaconu, Londonderry, NH (US); Paul A. David, Bow, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 14 days.

(21) Appl. No.: 17/232,440

(22) Filed: Apr. 16, 2021

(51) Int. Cl.
*G01D 5/14* (2006.01)
*G01B 7/30* (2006.01)

(52) U.S. Cl.
CPC ............... *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS

| | | | |
|---|---|---|---|
| 4,327,416 A | 4/1982 | Jerrim | |
| 4,668,914 A | 5/1987 | Kersten et al. | |
| 4,725,957 A | 2/1988 | Alberter et al. | |
| 4,761,569 A | 8/1988 | Higgs | |
| 4,829,352 A | 5/1989 | Popovic et al. | |
| 5,331,218 A | 7/1994 | Moody | |
| 5,541,506 A | 7/1996 | Kawakita et al. | |
| 5,572,058 A | 11/1996 | Biard | |
| 5,612,618 A | 3/1997 | Arakawa | |
| 5,619,137 A | 4/1997 | Vig et al. | |
| 5,621,319 A | 4/1997 | Bilotti et al. | |
| 5,657,189 A | 8/1997 | Sandhu | |
| 5,694,038 A | 12/1997 | Moody et al. | |
| 5,714,883 A | 2/1998 | Schroeder et al. | |
| 5,831,513 A | 11/1998 | Lue | |
| 5,841,621 A | 11/1998 | Dean et al. | |
| 5,844,411 A | 12/1998 | Vogt | |
| 5,942,895 A | 8/1999 | Popovic et al. | |
| 6,064,199 A | 5/2000 | Walter et al. | |
| 6,064,202 A | 5/2000 | Steiner et al. | |
| 6,091,239 A | 7/2000 | Vig et al. | |

(Continued)

FOREIGN PATENT DOCUMENTS

DE 102005024879 A1 12/2006
DE 102005014509 B4 9/2007

(Continued)

OTHER PUBLICATIONS

U.S. Appl. No. 17/344,295, filed Jun. 10, 2021, Vuillermet, et al.
Response to European Official Communication filed on Nov. 23, 2021 for European Application No. 21151501.0; 53 pages.

(Continued)

*Primary Examiner* — Reena Aurora
(74) *Attorney, Agent, or Firm* — Daly, Crowley, Mofford & Durkee, LLP

(57) ABSTRACT

A system and a method can use a magnetic field sensor to measure rotation angles of a ferromagnetic object in the form of a screw having screw threads. The magnetic field sensor can use a plurality of correction coefficients to improve an accuracy of the measured rotation angles of the ferromagnetic object. The magnetic field sensor can be disposed to a side of the screw.

32 Claims, 12 Drawing Sheets

(56) References Cited

U.S. PATENT DOCUMENTS

| | | |
|---|---|---|
| 6,100,680 A | 8/2000 | Vig et al. |
| 6,166,535 A | 12/2000 | Irle et al. |
| 6,181,036 B1 | 1/2001 | Kazama et al. |
| 6,232,768 B1 | 5/2001 | Moody et al. |
| 6,236,199 B1 | 5/2001 | Irle et al. |
| 6,265,864 B1 | 7/2001 | De Winter et al. |
| 6,288,533 B1 | 9/2001 | Haeberli et al. |
| 6,297,627 B1 | 10/2001 | Towne et al. |
| 6,356,741 B1 | 3/2002 | Bilotti et al. |
| 6,459,261 B1 | 10/2002 | Luetzow et al. |
| 6,525,531 B2 | 2/2003 | Forrest et al. |
| 6,542,068 B1 | 4/2003 | Drapp et al. |
| 6,545,462 B2 | 4/2003 | Schott et al. |
| 6,622,012 B2 | 9/2003 | Bilotti et al. |
| 6,686,733 B2 | 2/2004 | Muth |
| 6,768,301 B1 | 7/2004 | Hohe et al. |
| 6,969,988 B2 | 11/2005 | Kakuta et al. |
| 7,030,606 B2 | 4/2006 | Kato et al. |
| 7,038,448 B2 | 5/2006 | Schott et al. |
| 7,085,119 B2 | 8/2006 | Bilotti et al. |
| 7,088,095 B1 | 8/2006 | Busch |
| 7,116,100 B1 | 10/2006 | Mock et al. |
| 7,119,538 B2 | 10/2006 | Blossfeld |
| 7,159,556 B2 | 1/2007 | Yoshihara |
| 7,235,968 B2 | 6/2007 | Popovic et al. |
| 7,259,556 B2 | 8/2007 | Popovic et al. |
| 7,307,824 B2 | 12/2007 | Bilotti et al. |
| 7,362,094 B2 | 4/2008 | Voisine et al. |
| 7,714,570 B2 | 5/2010 | Thomas et al. |
| 7,746,065 B2 | 6/2010 | Pastre et al. |
| 7,759,929 B2 | 7/2010 | Forsyth |
| 7,872,322 B2 | 1/2011 | Schott et al. |
| 7,911,203 B2 | 3/2011 | Thomas et al. |
| 7,965,076 B2 | 6/2011 | Schott |
| 7,990,209 B2 | 8/2011 | Romero |
| 7,994,774 B2 | 8/2011 | Thomas et al. |
| 8,022,692 B2 | 9/2011 | Fernandez et al. |
| 8,350,563 B2 | 1/2013 | Haas et al. |
| 8,416,014 B2 | 4/2013 | Romero |
| 8,680,846 B2 | 3/2014 | Cesaretti et al. |
| 8,729,890 B2 | 5/2014 | Donovan et al. |
| 9,062,990 B2 | 6/2015 | Petrie |
| 9,377,285 B2 | 6/2016 | Romero et al. |
| 9,389,060 B2 | 7/2016 | Romero et al. |
| 9,400,164 B2 | 7/2016 | Daubert et al. |
| 9,410,788 B2 | 8/2016 | Wallrafen |
| 9,417,295 B2 | 8/2016 | Friedrich et al. |
| 9,574,867 B2 | 2/2017 | Uberti et al. |
| 9,605,975 B2 | 3/2017 | Foletto et al. |
| 9,664,497 B2 | 5/2017 | Kerdraon et al. |
| 9,810,519 B2 | 11/2017 | Taylor et al. |
| 9,869,566 B2 | 1/2018 | Tima et al. |
| 10,120,042 B2 | 11/2018 | Diaconu et al. |
| 10,254,103 B2 | 4/2019 | Taylor et al. |
| 10,323,958 B2 | 6/2019 | Kranz et al. |
| 10,408,639 B2 | 9/2019 | Hakspiel et al. |
| 10,598,515 B2 | 3/2020 | Tima et al. |
| 10,816,366 B2 | 10/2020 | Weiland et al. |
| 10,866,122 B2 | 12/2020 | Weiland et al. |
| 2002/0053903 A1 | 5/2002 | Kempe |
| 2003/0042894 A1 | 3/2003 | Waffenschmidt |
| 2003/0057941 A1 | 3/2003 | Collier-Hallman et al. |
| 2003/0155912 A1 | 8/2003 | Motz |
| 2004/0239313 A1 | 12/2004 | Godkin |
| 2005/0248306 A1 | 11/2005 | Chen et al. |
| 2005/0278137 A1 | 12/2005 | Hammerschmidt et al. |
| 2006/0011999 A1 | 1/2006 | Schott et al. |
| 2006/0290545 A1 | 12/2006 | Granig et al. |
| 2007/0029998 A1 | 2/2007 | Popovic et al. |
| 2008/0040021 A1 | 2/2008 | Staniewicz |
| 2008/0174301 A1 | 7/2008 | Mattson |
| 2008/0184799 A1 | 8/2008 | Phan Le et al. |
| 2009/0001965 A1 | 1/2009 | Ausserlechner et al. |
| 2009/0102463 A1 | 4/2009 | May |
| 2009/0121707 A1 | 5/2009 | Schott |
| 2009/0123098 A1 | 5/2009 | Takahashi |
| 2009/0146647 A1 | 6/2009 | Ausserlechner |
| 2009/0174395 A1 | 7/2009 | Thomas et al. |
| 2010/0030427 A1 | 2/2010 | Mitsuhara et al. |
| 2010/0045632 A1 | 2/2010 | Yilmaz et al. |
| 2010/0156397 A1 | 6/2010 | Yabusaki et al. |
| 2010/0164491 A1 | 7/2010 | Kejik et al. |
| 2010/0188074 A1 | 7/2010 | Matsumoto et al. |
| 2011/0043197 A1 | 2/2011 | Trontelj |
| 2011/0227568 A1 | 9/2011 | Dordet et al. |
| 2011/0248708 A1 | 10/2011 | Thomas et al. |
| 2012/0041691 A1* | 2/2012 | Fericean ............... G01L 3/105 702/41 |
| 2012/0086442 A1 | 4/2012 | Haas et al. |
| 2012/0095712 A1 | 4/2012 | Komasaki et al. |
| 2012/0158335 A1 | 6/2012 | Donovan et al. |
| 2012/0262155 A1 | 10/2012 | Donovan et al. |
| 2012/0313635 A1 | 12/2012 | Daubert |
| 2013/0113469 A1 | 5/2013 | Wallrafen |
| 2013/0265037 A1 | 10/2013 | Friedrich et al. |
| 2013/0320970 A1 | 12/2013 | Foletto et al. |
| 2014/0003464 A1 | 1/2014 | Ausserlechner et al. |
| 2015/0022187 A1 | 1/2015 | Taylor et al. |
| 2015/0022188 A1 | 1/2015 | Daubert et al. |
| 2015/0061471 A1 | 3/2015 | Kopecek |
| 2015/0176962 A1 | 6/2015 | Kerdraon et al. |
| 2015/0192433 A1 | 7/2015 | Onodera et al. |
| 2015/0377648 A1 | 12/2015 | Sirohiwala et al. |
| 2016/0069710 A1 | 3/2016 | Ausserlechner |
| 2016/0138983 A1 | 5/2016 | Ikeda |
| 2016/0178401 A1 | 6/2016 | Hakspiel et al. |
| 2016/0216133 A1 | 7/2016 | Ausserlechner |
| 2019/0234769 A1* | 8/2019 | Fontanet ............... G01D 5/2291 |
| 2020/0370924 A1 | 11/2020 | Bilbao de Mendizabal et al. |
| 2020/0400463 A1 | 12/2020 | Sogo et al. |
| 2021/0055131 A1 | 2/2021 | Dupre et al. |

FOREIGN PATENT DOCUMENTS

| | | |
|---|---|---|
| DE | 102006037226 A1 | 2/2008 |
| EP | 0781979 A2 | 7/1997 |
| EP | 0916074 A1 | 5/1999 |
| EP | 0631416 B1 | 9/2002 |
| EP | 0875733 B1 | 3/2004 |
| EP | 1679524 A1 | 7/2006 |
| EP | 2000814 A2 | 12/2008 |
| EP | 3855128 A1 | 7/2021 |
| JP | S 58-055688 A | 4/1983 |
| JP | 2003-042709 | 2/2003 |
| JP | 2005-241269 | 9/2005 |
| JP | 2007-304000 A | 11/2007 |
| JP | 2008-509414 | 3/2008 |
| JP | 2008286695 A | 11/2008 |
| JP | 2010-014607 | 1/2010 |
| JP | 2010-078366 | 4/2010 |
| KR | 10-2005-0016122 | 2/2005 |
| WO | WO 94/20820 | 9/1994 |
| WO | WO 98/02721 | 1/1998 |
| WO | WO 1998/010302 | 3/1998 |
| WO | WO 1998/054547 | 12/1998 |
| WO | WO 2000/002266 | 1/2000 |
| WO | WO 0242713 | 5/2002 |
| WO | WO 2003/036732 A2 | 5/2003 |
| WO | WO 2004/025742 A1 | 3/2004 |
| WO | WO 2006/056289 A1 | 6/2006 |
| WO | WO 2006/074989 A2 | 7/2006 |
| WO | WO 2008145662 A1 | 12/2008 |
| WO | WO 2009/124969 A1 | 10/2009 |
| WO | WO 2012/141950 | 10/2012 |
| WO | WO 2014/126670 | 8/2014 |
| WO | WO 2015/013705 | 1/2015 |

OTHER PUBLICATIONS

Kejik et al.; "Circular Hall Transducer for Angular Position Sensing;" 2007 IEEE Solid-State Sensors and Microsystems Conference, Transducers, 2007; Jun. 10-14, 2007; 4 Pages.

(56) References Cited

OTHER PUBLICATIONS

Reymond et al.; "True 2D CMOS Integrated Hall Sensor;" 2007 IEEE Sensors Conference; Oct. 28-31, 2007; 4 Pages.
Schurig et al.; "CMOS Integrated Vertical Hall Sensor With Low Offset;" XVI The 16th European Conference on Solid-State Transducers; Prague, Czech Republic; Sep. 16-19, 2002; 4 Pages.
Allegro Microsystems, Inc.; "High Precision Linear Hall Effect Sensor IC with a Push/Pull, Pulse Width Modulated Output;" A1351; 23 Pages.
Allegro Microsystems, Inc.; "High Precision 2-Wire Linear Hall Effect Sensor IC with a Pulse Width Modulated Output;" A1354; 22 Pages.
Allegro Microsystems, Inc.; "High Precision Linear Hall-Effect Sensor with an Open Drain Pulse Width Modulated Output;" A1356; 20 Pages.
Allegro Microsystems, Inc.; "Low-Noise Programmable Linear Hall Effect Sensor ICs with Adjustable Bandwidth (50 kHz Maximum) and Analog Output;" A1360, A1361 and A1362; 25 Pages.
Baschirotto et al.; "Development and Analysis of a PCB Vector 2-D Magnetic Field Sensor System for Electronic Compasses;" IEEE Sensors Journal, vol. 6, No. 2; Apr. 2006; 7 Pages.
Kejik, et al.; "Purley CMOS Angular Position Sensor Based on a New Hall Microchip;" 34th Annual Conference of IEEE Industrial Electronics; IECON; Nov. 10-13, 2008; 5 Pages.
Kejik,.et al.; "Ultra Low-Power Angular Position Sensor for High-Speed Portable Applications;" 2009 IEEE Sensors Conference; Oct. 25-28, 2009; pp. 173-176.
Gerhauser; "Intelligente 3D-Magnetfeld Snesorik;" Fraunhofer-Institut for Integrierte Schaltungen IIS; www.iis.fraunhofer.de/asic/analog; Oct. 2009; 12 pages.
Melexis Microelectronic Integrated Systems; MLX90333; "Triaxis 3D-Joystick Position Sensor;" Data Sheet; Mar. 2009; 43 pages.
MEMSIC Corporation; AN-00MM-004; "Electronic Tilt Compensation;" Mar. 2008; 5 pages.
MEMSIC Corporation; AN-00MM-003; "Magnetic Sensor Calibration;" Mar. 2008; 5 pages.
MEMSIC Corporation; AN-00MM-002; "Magnetometer Soldering Methodology;" Jun. 2008; 2 pages.
MEMSIC Corporation; AN-00MM-001; "Magnetometer Fundamentals;" Jun. 2008; 6 pages.
MEMSIC Corporation; AN-00MM-005; "Magnetic Sensor Placement Guidelines;" Oct. 2008; 2 pages.
MEMSIC Corporation; MMC312xMQ; "Tri-axis Magnetic Sensor, with I$^2$C Interface;" Aug. 14, 2008; 9 pages.
MEMSIC Corporation; MMC314xMS; "Ultra Small 3-axis Magnetic Sensor, with I$^2$C Interface;" Mar. 31, 2010; 8 pages.
Micronas GmbH; "HAL®3625 Programmable Direct Angle Sensor;" Product Information; Sep. 2009; 2 pages.
Allegro Microsystems, Inc.; "A1140/41/42/43 Data Sheet: Sensitive Two-Wire Chopper-Stabilized Unipolar Hall-Effect Switches;" published Sep. 9, 2004; 10 Pages.
Allegro Microsystems, Inc.; "A1174 Data Sheet: Ultrasensitive Hall Effect Latch with Internally or Externally Controlled Sample and Sleep Periods for Track Ball and Scroll Wheel Applications;" published Jul. 25, 2008; 13 Pages.
Allegro Microsystems, Inc.; "A1230 Data Sheet: Ultra-Sensitive Dual-Channel Quadrature Hall-Effect Bipolar Switch;" published Mar. 26, 2010; 16 pages.
Allegro Microsystems, Inc.; "A1360, A1361 and A1362 Data Sheet: Low-Noise Programmable Linear Hall Effect Sensors with Adjustable Bandwidth (50 kHz Maximum) and Analog Output;" published Mar. 18, 2008; 25 Pages.
Allegro Microsystems, Inc.; "A3212 Data Sheet: Micropower, Ultra-Sensitive Hall-Effect Switch;" published Sep. 22, 2004; 12 Pages.
Allegro Microsystems, Inc.; "ATS675LSE Data Sheet: Self-Calibrating TPOS Speed Sensor Optimized for Automotive Cam Sensing Applications;" published Jul. 11, 2008; 13 Pages.
Allegro Microsystems, Inc.; "27701-AN Data Sheet: Hall-Effect IC Applications Guide;" Application Information, Rev. 2; http://www.allegromicro.com/en/products/design/hall-effect-sensor-ic-appiications-guide/AN27701.pdf; downloaded Sep. 29, 2010; 40 Pages.
Allegro Microsystems, Inc.; "3235 Data Sheet 27633A, Dual-Output Hall-Effect Switch;" http://www.datasheetcatalog.org/datasheets/90/205047_DS.pdf; downloaded Sep. 29, 2010; 6 Pages.
Allegro Microsystems, Inc.; "A3425 Data Sheet: Dual, Chopper-Stabilized, Ultra-Sensitive Bipolar Hall-Effect Switch;" published Jun. 28, 2002; 10 Pages.
Atherton et al.; "Sensor Signal Conditioning—an IC Designer's Perspective;" IEEE Electro International; Apr. 26-28, 1991; 6 Pages.
Austria Microsystems; "AS5040 datasheet; 10-Bit Programmable Magnetic Rotary Encoder;" Revision 1.1; Jan. 2004; 20 Pages.
Banjevic et al; "2D CMOS Integrated Magnetometer Based on the Miniaturized Circular Vertical Hall Device;" International Solid-State Sensors, Actuators and Microsystems Conference; Transducers; Jun. 21-25, 2009; 4 Pages.
Blanchard et al.; "Cylindrical Hall Device;" International Electron Devices Meeting; Dec. 8-11, 1996; 4 Pages.
Burger et al.; "New fully integrated 3-D silicon Hall sensor for precise angular-position measurements;" Sensors and Actuators, A 67; May 1998; 5 Pages.
Dwyer; "Allegro Microsystems, Inc.; AN296061 Data Sheet: Ring Magnet Speed Sensing for Electronic Power Steering;" published Jul. 21, 2009; 4 Pages.
Freitas et al.; "Giant magnetoresistive sensors for rotational speed control;" Jorunal of Applied Physics, vol. 85, No. 8; Apr. 15, 1999; 3 Pages.
Gilbert; "Technical Advances in Hall-Effect Sensing;" Allegro Microsystems, Inc. Product Description; May 10, 2008; 7 Pages.
Haberli et al.; "Contactless Angle Measurements by CMOS Magnetic Sensor with on Chip Read-Out Circuit;" The 8th International Conference on Solid-State Sensors and Actuators and Eurosensors IX; Jan. 25-29, 1995; 4 Pages.
Häberli et al.; "Two-Dimensional Magnetic Microsensor with on-Chip Signal Processing for Contactless Angle Measurement;" IEEE Journal of Solid-State Circuits, vol. 31, No. 12; Dec. 1996; 6 Pages.
Hiligsmann et al.; "Monolithic 360 Degrees Rotary Position Sensor IC;" 2004 IEEE Proceedings of Sensors, vol. 3; Oct. 24-27, 2004; 6 Pages.
Kejik et al.; "Circular Hall Transducer for Angular Position Sensing;" International Solid-State Sensors, Actuators and Microsystems Conference; Transducers; Jun. 2007; 4 Pages.
Lou Law; "Angle Position Sensing with 2-Axis Hall ICs;" Sensors Magazine, vol. 20, No. 3; Mar. 2003; 7 Pages.
Masson et al.; "Multiturn and high precision through-shaft magnetic sensors;" Sensor + Text Conference; Proceedings II; May 2009; 6 Pages.
Metz et al.; "Contactless Angle Measurement Using Four Hall Devices on Single Chip;"; International Conference on Solid State Sensors and Actuators; Transducers; vol. 1; Jun. 16-19, 1997; 4 pages.
Munter; "A Low-offset Spinning-current Hall Plate;" Sensors and Actuators, vol. A21-A23; Jan. 1990; 4 Pages.
Novotechnik Siedle Group; "How New Angular Positioning Sensor Technology Opens a Broad Range of New Applications;" Vert-X Technology; Dec. 2001; 5 Pages.
Paranjape et al.; "A CMOS-compatible 2-D vertical Hall magnetic-field sensor using active carrier confinement and post-process micromachining;" The 8th International Conference on Solid-State Sensors and Acutators, Physical vol. 53, Issues 1-3; May 1996; 6 Pages.
Petoussis et al.; "A Novel Hall Effect Sensor Using Elaborate Offset Cancellation Method;" Sensors & Transducers Journal, vol. 100, Issue 1; Jan. 2009; 7 pages.
Popovic; "Not-plate-like Hall magnetic sensors and their applications;" Sensors and Actuators A: Physical, vol. 85, Issues 1-3; Aug. 2000; 9 Pages.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; 4 Pages.

(56) References Cited

OTHER PUBLICATIONS

Roumenin; "Magnetic sensors continue to advance towards perfection;" Sensors and Actuators A: Physical, vol. 46-47, Issues 1-3; Jan.-Feb. 1995; 7 Pages.
Schneider et al.; "Temperature Calibration of CMOS Magnetic Vector Probe for Contactless Angle Measurement System;" International Electron Devices Meeting; Dec. 8-11, 1996; 4 Pages.
Sensima technology sa; "CVHD: a new concept of Angular Position Sensor;" Slide Presentation for Allegro Microsystems; Mar. 2009; 17 Pages.
Sentron; AN-101; "Angular position sensing with 2-Axis Hall IC 2SA-10;" Feb. 12, 2004; http://www.diegm.uniud.it/petrella/Azionamenti%20Elettrici%2011/Sensori%20e%20trasduttori/Data%20Sheet%20-%202SA-10pdf; 7 Pages.
Van der Meer; et al; "CMOS quad spinning-current Hall-sensor system for compass application;" IEEE Proceedings of Sensors, vol. 3; Oct. 24-27, 2004; 4 Pages.
Vogelgesang et al.; Robert Bosch GmbH; "GMR sensors in automotive application;" CS-SNS/ECS Slides Presentation; Mar. 2, 2005; 16 Pages.
Voider; "The CORDIC Trigonometric Computing Technique;" The Institute of Radio Engineers, Inc.; IRE Transactions on Electronic Computers, vol. EC, Issue 3; Sep. 1959; 5 Pages.
Drijaca, et al.; "Nonlinear Effects In Magnetic Angular Position Sensor With Integrated Flux Concentrator;" Proc. $23^{rd}$ International Conference on Microelectronics (MIEL2002); vol. 1; NIS; Yugoslavia; May 12-15, 2002; 4 Pages.
Melexis MLX 90324; ""Under-the-Hood" Triaxis Rotary Position feat. SENT Protocol;" 3901090324 Data Sheet; Dec. 2008; 40 pages.
Analog Devices; "AD639: Universal Trigonometric Function Converter;" http://www.analog.com/en/obsolete/ad639/products/product.html; Jun. 1985; 13 pages.
Intersil; "ICL8038 Precision Waveform Generator/Voltage controlled Oscillator;" http.//www.intersil.com/en/products/other-analog/special-analog/other-miscellaneous/ICL8038.html; downloaded Jan. 16, 2014; 13 pages.
Banjevic; "High Bandwidth CMOS Magnetic Sensors Based on the Miniaturized Circular Vertical Hall Device;" Sep. 2011; 153 pages.
PCT Search Report of the ISA for PCT/US2014/011580 dated June 24, 2014 6 pages.
PCT Written Opinion of the ISA for PCT/US2014/011580 dated Jun. 24, 2014 7 pages.
International Search Report and Written Opinion dated Sep. 8, 2014 for PCT Application No. PCT/US2014/043770; 14 pages.
PCT Search Report and Written Opinion of ISA; for PCT Pat. App. No. PCT/US2014/069729; dated Feb. 18, 2015; 19 pages.
PCT International Preliminary Report on Patentability and Written Opinion of the ISA dated Aug. 27, 2015; For Pat. App. No. PCT/US2014/011580; 8 pages.
European Patent Office Rule 161 dated Sep. 22, 2015; For European Pat. App. No. 14702173.7-1560; 2 pages.
Office Action dated Jan. 13, 2016; For Pat. U.S. Appl. No. 13/947,608; 36 pages.
International Preliminary Report on Patentability dated Feb. 4, 2016 for PCT Application No. PCT/US2014/043770; 10 pages.
Response filed Jan. 13, 2016 to Office Action dated Mar. 4, 2016 for U.S. Appl. No. 13/947,608, 9 pages.
Response dated Apr. 4, 2016 to Official Communication dated Sep. 22, 2015; For European Pat. App. No. 14702173.7; 3 pages.
Amended Specification and Claims dated Apr. 4, 2016; For European Pat. App. No. 14702173.7; 9 pages.
U.S. Non-Final Office Action dated Jul. 20, 2015 for U.S. Appl. No. 13/766,327; 52 Pages.
Response to U.S. Non-Final Office Action dated Jul. 20, 2015 2015 for U.S. Appl. No. 13/766,327; Response filed on Nov. 20, 2015; 17 Pages.
Notice of Allowance dated Dec. 24, 2015 for U.S. Appl. No. 13/766,327; 13 Pages.
Notice of Allowance dated Mar. 11, 2016 for U.S. Appl. No. 13/766,327; 11 Pages.
Japanese Office Action with English Translation dated Sep. 7, 2017 for Japanese Application No. 2015-558010; 5 Pages.
Korean Notice of Allowance with English Translation dated Dec. 11, 2019 for Korean Application No. 10-2015-7024923; 5 Pages.
Korean Office Action with English Translation dated Aug. 29, 2019 for Korean Application No. 10-2015-7024923; 21 Pages.
Response to Korean Office Action with English Translation dated Aug. 29, 2019 for Korean Application No. 10-2015-7024923; Response filed on Oct. 23, 2019; 44 Pages.
Japanese Notice of Allowance with English Translation dated Dec. 1, 2017 for Japanese Application No. 2015-558010; 5 Pages.
Response to Japanese Office Action dated Sep. 7, 2017 for Japanese Application No. 2015-558010; Response filed on Nov. 22, 2017; 18 Pages.
PCT Search Report of the ISA for PCT/US2014/011579 dated Jun. 4, 2014; 6 Pages.
PCT Written Opinion of the ISA for PCT/US2014/011579 dated Jun. 4, 2014; 9 Pages.
U.S. Non-Final Office Action dated Jun. 19, 2015 for U.S. Appl. No. 13/766,341; 39 Pages.
PCT International Preliminary Report on Patentability and Written Opinion of the ISA dated Aug. 27, 2015; For Pat. App. No. PCT/US2014/011579; 11 pages.
European Patent Office Rule 161 dated Sep. 17, 2015; For European Pat. App. No. 14702172.9-1560; 2 pages.
Response dated Mar. 24, 2016 to Office Action dated Sep. 17, 2015; For European Pat. App. No. 14702172.9; 5 pages.
Amended Claims and Amended Specification dated Mar. 24, 2016; For European Pat. App. No. 14702172.9; 10 pages.
Response to U.S. Non-Final Office Action dated Jun. 19, 2015 to U.S. Appl. No. 13/766,341; Response filed on Oct. 19, 2015; 17 Pages.
U.S. Final Office Action dated Jan. 4, 2016 for U.S. Appl. No. 13/766,341; 14 Pages.
Response to U.S. Final Office Action dated Jan. 4, 2016 for U.S. Appl. No. 13/766,341; Response filed on Mar. 2, 2016; 12 Pages.
Notice of Allowance dated Mar. 21, 2016 for U.S. Appl. No. 13/766,341; 9 Pages.
Examination Report dated May 14, 2019 for European Application No. 14702172.9; 6 Pages.
Response to Examination Report dated May 14, 2019 for European Application No. 14702172.9; Response filed on Nov. 13, 2019; 4 Pages.
PCT Search Report and Written Opinion of ISA for PCT/US2014/070339 dated Mar. 25, 2015; 16 pages.
Preliminary Amendment filed on Feb. 24, 2015; For Pat. U.S. Appl. No. 14/570,357; 12 pages.
PCT International Preliminary Report on Patentability and Written Opinion dated Jul. 7, 2016; for PCT Pat. App. No. PCT/US2014/070339; 14 pages.
Office Action dated Sep. 15, 2016, for U.S. Appl. No. 14/570,357; 17 pages.
Response filed on Dec. 9, 2016 to Office Action dated Sep. 15, 2016; for U.S. Appl. No. 14/570,357; 26 pages.
Notice of Allowance dated Jan. 13, 2017 corresponding to U.S. Appl. No. 14/570,357; 11 Pages.
Letter from A.A. Thornton letter dated Feb. 13, 2017 regarding amended claims for EP Pat. Appl. No. 14827615.7; 4 pages.
Amended Claims pp. 36 to 45 regarding A.A. Thornton letter dated Feb. 13, 2017 for EP Pat. Appl. No. 14827615.7; 10 pages.
PCT International Search Report and Written Opinion dated May 18, 2017 for International PCT Application No. PCT/US/2017/014505; 14 pages.
PCT Communication relating to the results of the partial international search for PCT/US2017/020067 dated Jun. 7, 2017; 11 pages.
Non-final Office Action dated Sep. 25, 2017 for U.S. Appl. No. 15/074,358; 22 pages.
EP Communication under Rule 71(3) EPC Intention to Grant dated Aug. 10, 2017 for EP Application No. 14827615.7; 7 pages.
EP Allowed Specification dated Jul. 2, 2015 for EP Application No. 14827615.7; 55 pages.

(56) References Cited

OTHER PUBLICATIONS

Notice of Allowance dated Oct. 6, 2017 for U.S. Appl. No. 15/042,469; 28 Pages.
Response to Office Action filed on Dec. 19, 2017 for U.S. Appl. No. 15/074,358; 10 pages.
Office Action Summary dated May 3, 2018 for U.S. Appl. No. 15/074,358; 7 pages.
Response to Office Action filed on Jul. 25, 2018 for U.S. Appl. No. 15/074,358; 10 pages.
Extended European Search Report dated Apr. 8, 2021 for European Application No. 21151501.0; 8 Pages.
Extended European Search Report dated Jun. 24, 2021 for European Application No. 21161065.4; 9 Pages.
Final Office Action dated Dec. 13, 2018 for U.S. Appl. No. 15/074,358; 7 pages.
Amendment under 37 C.F.R. §1.116 filed on Jan. 22, 2019 for U.S. Appl. No. 15/074,358; 10 pages.
Notice of Allowance dated Feb. 21, 2019 for U.S. Appl. No. 15/074,358; 9 pages.
EP response to Official Communication with Clean and Tracked Specification and Claims filed on Apr. 29, 2019 for EP Pat. Appl. No. 17713507.6; 91 pages.
Response filed on Mar. 29, 2019 for European Application No. 17703563.1; 38 Pages.
European Rules 161 and 162 Communication dated Sep. 19, 2018 for European Application No. 17703563.1; 3 Pages.
PCT International Preliminary Report dated Aug. 23, 2018 for International Application No. PCT/US2017/014505; 9 Pages.
PCT International Search Report and Written Opinion dated Sep. 5, 2017 for International Application No. PCT/US2017/020067; 21 Pages.
PCT International Preliminary Report dated Sep. 27, 2018 for International Application No. PCT/US2017/020067; 12 Pages.
European Rules 161 and 162 Communication dated Oct. 19, 2018 for European Application No. 17713507.6; 3 Pages.
U.S. 312 Amendment filed on Apr. 7, 2017 for U.S. Appl. No. 14/570,357; 13 Pages.
European Rules 161 and 162 Communication dated Aug. 3, 2016 for European Application No. 14827615.7; 2 Pages.
European Examination Report dated Dec. 13, 2019 for European Application No. 17703563.1; 6 Pages.
U.S. Non-Final Office Action dated Jul. 30, 2019 for U.S. Appl. No. 15/834,569; 22 Pages.
Response to U.S. Non-Final Office Action dated Jul. 30, 2019 for U.S. Appl. No. 15/834,569; Response filed on Sep. 9, 2019; 11 Pages.
Notice of Allowance dated Dec. 4, 2019 for U.S. Appl. No. 15/834,569; 10 Pages.
Response to Examination Report dated Dec. 13, 2019 for European Application No. 17703563.1; Response filed Apr. 21, 2020; 3 Pages.
Notice of Intention to Grant dated Jul. 8, 2020 for European Application No. 17703563.1; 7 Pages.
Notice of Intention to Grant dated Dec. 7, 2020 for European Application No. 17703563.1; 7 Pages.
Response to Notice of Intention to Grant dated Dec. 7, 2020 European Application No. 17703563.1; Response filed Feb. 16, 2021; 1 Page.
Examination Report dated Feb. 22, 2019 for European Application No. 14702173.7; 6 Pages.
Response to Examination Report dated Feb. 22, 2019 for European Application No. 14702173.7; Response filed on Sep. 4, 2019; 3 Pages.
Notice of Allowance dated Jan. 23, 2020 for U.S. Appl. No. 15/834,569; 11 Pages.
Notice of Intention to Grant dated Oct. 29, 2020 for Application No. 14702173.7; 7 Pages.
Response to Official Communication dated Aug. 2, 2021 for European Application No. 21161065.4; Response filed Jan. 28, 2022; 23 Pages.
U.S. Non-Final Office Action dated Jun. 22, 2022 for U.S. Appl. No. 17/344,295; 18 pages.

* cited by examiner

Calibration Value Table EEPROM
Air Gap m
Harmonics 1 to N
Temps 0 to 4

| T Seg # | Temp | Average | Amp 1 | Phase 1 | ... | Amp Nm | Phase Nm |
|---|---|---|---|---|---|---|---|
| | T0 | Avg m0 | Amp 1m0 | Phase 1m0 | | Amp Nm0 | Phase Nm0 |
| 1 | T1 | Avg m1 | Amp 1m1 | Phase 1m1 | | Amp Nm1 | Phase Nm1 |
| 2 | T2 | Avg m2 | Amp 1m2 | Phase 1m2 | | Amp Nm2 | Phase Nm2 |
| 3 | T3 | Avg m3 | Amp 1m3 | Phase 1m3 | | Amp Nm3 | Phase Nm3 |
| 4 | T4 | Avg m4 | Amp 1m4 | Phase 1m4 | | Amp Nm4 | Phase Nm4 |

*FIG. 9*

Error Harmonic Content (Amplitude and Phase, in degrees)
For Uncorrected Error - Experimental Results

| Harmonic | Air Gap [mm] | | | | |
|---|---|---|---|---|---|
| | 1 | 1.1 | 1.2 | 1.3 | 1.4 |
| A1 | 4.74 | 4.68 | 4.63 | 4.45 | 4.55 |
| A2 | 0.54 | 0.47 | 0.42 | 0.45 | 0.34 |
| A3 | 4.62 | 4.66 | 4.67 | 4.49 | 4.63 |
| A4 | 0.13 | 0.28 | 0.37 | 0.44 | 0.42 |
| A5 | 0.12 | 0.17 | 0.18 | 0.20 | 0.30 |
| A6 | 0.22 | 0.22 | 0.27 | 0.30 | 0.27 |
| A7 | 0.12 | 0.17 | 0.25 | 0.31 | 0.34 |
| A8 | 0.01 | 0.02 | 0.03 | 0.06 | 0.04 |

| Harmonic | Air Gap [mm] | | | | |
|---|---|---|---|---|---|
| | 1 | 1.1 | 1.2 | 1.3 | 1.4 |
| Ph1 | 191.4 | 190.9 | 189.9 | 190.1 | 189.6 |
| Ph2 | 330.2 | 337.4 | 343.3 | 344.0 | 351.2 |
| Ph3 | 87.6 | 86.3 | 84.7 | 81.9 | 81.5 |
| Ph4 | 47.5 | 80.8 | 97.7 | 110.9 | 109.1 |
| Ph5 | 4.9 | 23.3 | 24.3 | 18.9 | 22.0 |
| Ph6 | -90.8 | -95.1 | -101.4 | -99.0 | -97.5 |
| Ph7 | -62.8 | -69.1 | -72.4 | -69.5 | -86.0 |
| Ph8 | -167.5 | 176.1 | 92.3 | 145.9 | -177.0 |

*FIG. 12*

SYSTEM AND RELATED TECHNIQUES THAT PROVIDE AN ANGLE SENSOR FOR SENSING AN ANGLE OF ROTATION OF A FERROMAGNETIC SCREW

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors and, more particularly, to a magnetic field sensor that can provide an output signal representative of an angle of rotation of a ferromagnetic object in the form of a screw shaft (more generally referred to as a ferromagnetic object below), for which angular errors are reduced.

BACKGROUND

Magnetic field sensors can be used in a variety of applications. In one application, a magnetic field sensor can be used to detect an angle of rotation of a ferromagnetic object. In another related application, a magnetic field sensor can be used to sense a rotation (e.g., a continuous or discontinuous rotation) of a ferromagnetic object.

Within a magnetic field sensor, planar Hall elements and vertical Hall elements are known types of magnetic field sensing elements. A planar Hall element tends to be responsive to magnetic field perpendicular to a surface of a substrate on which the planar Hall element is formed. A vertical Hall element tends to be responsive to a magnetic field parallel to a surface of a substrate on which the vertical Hall element is formed. Also within a magnetic field sensor, various types of magnetoresistance elements are known. Most types of magnetoresistance elements tend to be responsive to magnetic fields parallel to a surface of a substrate on which the magnetoresistance element is formed.

Various parameters characterize the performance of magnetic field sensing elements and magnetic field sensors that use magnetic field sensing elements. These parameters include sensitivity, which is a change in an output signal of a magnetic field sensing element in response to a change of magnetic field experienced by the magnetic sensing element, and linearity, which is a degree to which the output signal of the magnetic field sensing element varies in direct proportion to the magnetic field. These parameters also include an offset, which is characterized by an output signal from the magnetic field sensing element not representative of a zero magnetic field when the magnetic field sensing element experiences a zero magnetic field.

More parameters can characterize the performance of an angle sensor and/or rotation sensor. One such parameter is an angular accuracy of an angle output signal generated by the angle sensor and/or rotation sensor. Angular accuracy can have both an average angle error (e.g., angle offset) that is substantially the same at all ferromagnetic object rotation angles, and also an angle error that is different at different ferromagnetic object rotation angles (e.g., a non-linearity error). Both of these types of angle errors can be influenced by temperature of the angle sensor and/or rotation sensor and also by geometric considerations, e.g., an air gap described more fully below.

Another parameter that can characterize the performance of an angle sensor and/or rotation sensor is the speed with which the angle sensor and/or rotation sensor can convey the angle of the ferromagnetic object. It will be understood that the speed is particularly important for applications in which the angle of a sensed ferromagnetic object may be rapidly changing.

It would be desirable to provide circuits and techniques that can provide an angle sensor and/or rotation sensor to sense an angle of rotation of a ferromagnetic object, which has a high degree of angle accuracy and which has a relatively high speed.

SUMMARY

The present invention provides circuits and techniques that can provide an angle sensor and/or rotation sensor to sense an angle of rotation of a ferromagnetic object, which has a high degree of angle accuracy and which has a relatively high speed.

In accordance with an example useful for understanding an aspect of the present invention, a system for sensing a angle of rotation of a ferromagnetic object having a rotation axis and a helical screw thread, the helical screw thread having a pitch defined by a distance between centers of two adjacent ridges of the helical screw thread, the system can include a magnetic field sensor having a substrate and a back bias magnet disposed proximate to the substrate and configured to generate a DC magnetic field. The magnetic field sensor can also include first and second magnetic field sensing elements disposed upon the substrate and disposed proximate to the ferromagnetic object, the first and second magnetic field sensing elements having a separation selected in a accordance with a first factor times the pitch, the first and second magnetic field sensing elements configured to generate first and second magnetic field signals, respectively, in response to the DC magnetic field but influenced by the ferromagnetic object. The magnetic field sensor can also include third and fourth magnetic field sensing elements disposed upon the substrate and disposed proximate to the ferromagnetic object, the third and fourth magnetic field sensing elements having a separation selected in accordance with the first factor times the pitch, the third magnetic field sensing element separated from the first magnetic field sensing element by a distance selected in accordance with a second factor times the pitch, the second factor less than the first factor, the third and fourth magnetic field sensing elements configured to generate third and fourth magnetic field signals, respectively, in response to the DC magnetic field but influenced by the ferromagnetic object. The magnetic field sensor can also include a first differential amplifier coupled to the first and second magnetic field signals and configured to generate a first differential signal as a difference of the first and second magnetic field signals; a second differential amplifier coupled to the third and fourth magnetic field signals and configured to generate a second differential signal as a difference of the third and fourth magnetic field signals. The magnetic field sensor can also include an angle calculation module coupled to the first and second differential signals and configured to generate an uncorrected angle value indicative of a rotation angle of the ferromagnetic object about the rotation axis of the ferromagnetic object.

In accordance with another example useful for understanding another aspect of the present invention, a method of sensing an angle of rotation of a ferromagnetic object having a rotation axis and a helical screw thread, the helical screw thread having a pitch defined by a distance between centers of two adjacent ridges to the helical screw thread, the method can include generating a DC magnetic field proximate to the ferromagnetic object with a back-bias magnet. The method can also include generating first and second magnetic field signals with first and second magnetic field sensing elements, respectively, in response to the DC magnetic field but influenced by the ferromagnetic object, the first and second magnetic field sensing elements disposed proximate to the ferromagnetic object, the first and second magnetic field sensing elements having a separation selected in accordance with a first factor times the pitch. The method can also include generating third and fourth magnetic field signals third and fourth magnetic field sensing elements, respectively, in response to the DC magnetic field but influenced by the ferromagnetic object, the third and fourth magnetic field sensing elements disposed proximate to the ferromagnetic object, the third and fourth magnetic field sensing elements having a separation selected in accordance with the first factor times the pitch, the third magnetic field sensing element separated from the first magnetic field sensing element by a distance selected in accordance with a second factor times the pitch, the second factor less than the first factor. The method can also include generating a first differential signal as a difference of the first and second magnetic field signals; generating a second differential signal as a difference of the third and fourth magnetic field signals. The method can also include using the first and second differential signals to generate an uncorrected angle value indicative of a rotation angle of the ferromagnetic object about the rotation axis of the ferromagnetic object.

In accordance with another example useful for understanding another aspect of the present invention, a system for sensing an angle of rotation of a ferromagnetic object having a rotation axis and a helical screw thread, the helical screw thread having a pitch defined by a distance between centers of two adjacent ridges of the helical screw thread, the system can include a magnetic field sensor having means for generating a DC magnetic field proximate to the ferromagnetic object and means for generating first and second magnetic field signals with first and second magnetic field sensing elements, respectively, in response to the DC magnetic field but influenced by the ferromagnetic object, the first and second magnetic field sensing elements disposed proximate to the ferromagnetic object, the first and second magnetic field sensing elements having a separation selected in a accordance with a first factor times the pitch. The magnetic field sensor can also include means for generating third and fourth magnetic field signals third and fourth magnetic field sensing elements, respectively, in response to the DC magnetic field but influenced by the ferromagnetic object, the third and fourth magnetic field sensing elements disposed proximate to the ferromagnetic object, the third and fourth magnetic field sensing elements having a separation selected in accordance with the first factor times the pitch, the third magnetic field sensing element separated from the first magnetic field sensing element by a distance selected in accordance with a second factor times the pitch, the second factor less than the first factor; means for generating a first differential signal as a difference of the first and second magnetic field signals. The magnetic field sensor can also include means for generating a second differential signal as a difference of the third and fourth magnetic field signals. The magnetic field sensor can also include means for using the first and second differential signals to generate an uncorrected angle value indicative of a rotation angle of the ferromagnetic object about the rotation axis of the ferromagnetic object.

BRIEF DESCRIPTION OF THE DRAWINGS

The foregoing features of the invention, as well as the invention itself may be more fully understood from the following detailed description of the drawings, in which:

FIG. 9 is a table showing an illustrative correction coefficient table that can be stored in the EEPROM of FIG. 5;

FIG. 12 is a chart showing error amplitudes and error phases of eight harmonics of an uncorrected angle signal generated by any of the magnetic field sensor described in figures above.

DETAILED DESCRIPTION

Figure 1:
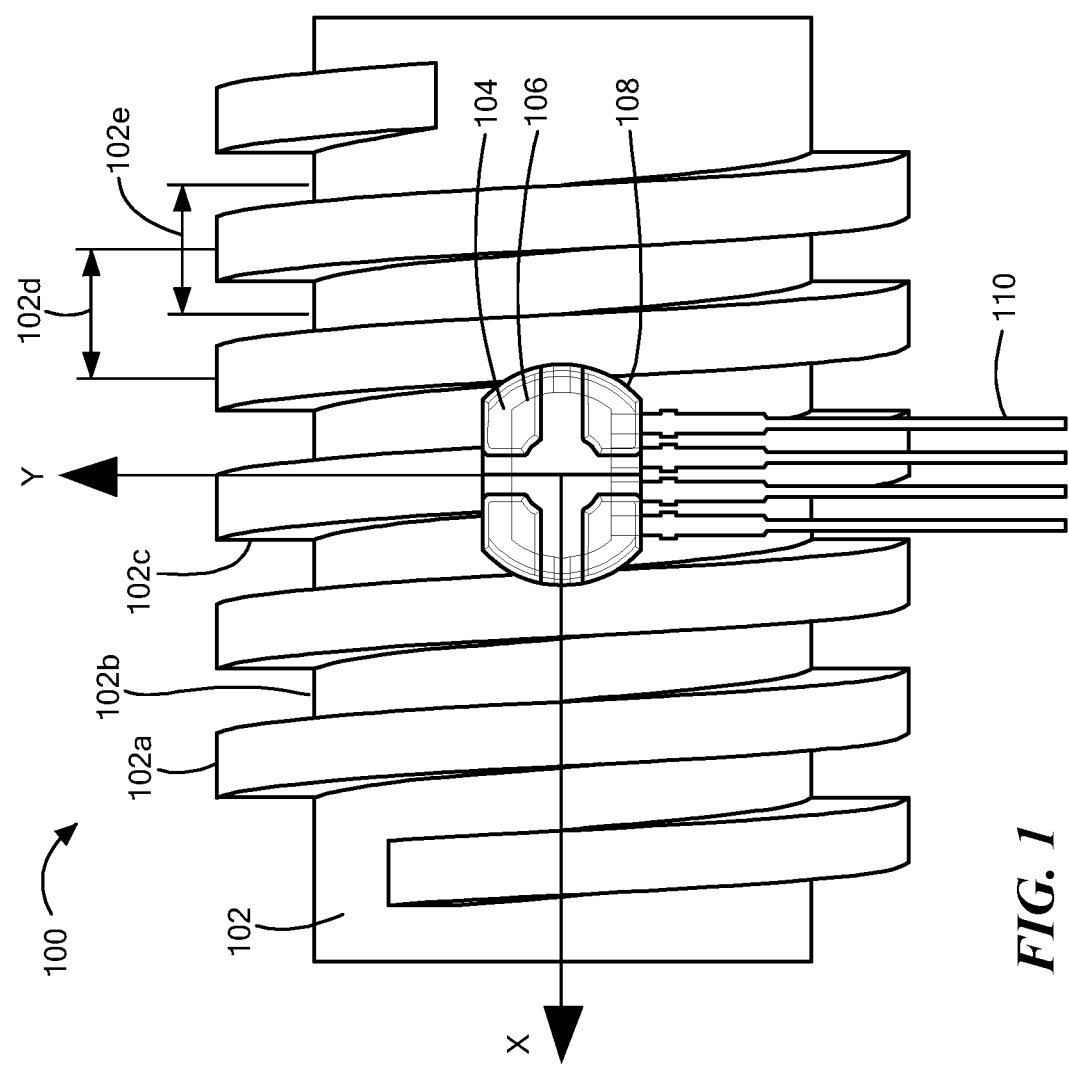
FIG. 1 is a pictorial showing a system having a ferromagnetic object capable of rotating, and a top view of a magnetic field sensor proximate to the ferromagnetic object.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, and a vertical Hall element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe an assembly that uses one or more magnetic field sensing elements in combination with an electronic circuit, all disposed upon a common substrate, e.g., a semiconductor substrate. Magnetic field sensors are used in a variety of applications, including, but not limited to, angle sensors that sense an angle of a direction of a magnetic field, angle sensors that sense an angle of rotation of a target object, and rotation sensors that sense rotation of a rotating target object (e.g., speed and direction of rotation).

Magnetic field sensors in the form of angle and/or rotation sensors that can sense an angle of rotation of a ferromagnetic object are described herein.

As used herein, the term "magnetic field signal" is used to describe any circuit signal that results from a magnetic field experienced by a magnetic field sensing element.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be analog or digital.

As used herein, the term "module" can be used to describe a "processor." However, the term "module" is used more generally to describe any circuit that can transform an input signal into an output signal that is different than the input signal.

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks (e.g., processors or modules), it will be understood that the analog blocks can be replaced by digital blocks (e.g., processors or modules) that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of an analog comparator having a two state output signal indicative of an input signal being above or below a threshold level (or indicative of one input signal being above or below another input signal). However, the comparator can also be comprised of a digital circuit (e.g., processor or module) having an output signal or value with at least two states indicative of an input signal or value being above or below a threshold level (or indicative of one input signal or value being above or below another input signal or value), respectively, or a digital signal or value above or below a digital threshold signal or value (or another digital signal or value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "amplifier" is used to describe a circuit element with a gain greater than one, less than one, or equal to one.

As used herein, the terms "line" and "linear" are used to describe either a straight line or a curved line. The line can be described by a function having any order less than infinite.

Referring to FIG. 1, an example of a system 100 for sensing an angle of rotation of a ferromagnetic object can include a magnetic field sensor 104 disposed proximate to the ferromagnetic object 102. The magnetic field sensor 104 is shown here from a top view. The ferromagnetic target 102 can be capable of rotating or spinning about a rotation axis, here parallel to an x-axis.

The ferromagnetic object 102 can be in the form of a screw having screw threads. Screw threads will be understood to mean a raised portion 102a, raised away from an axis of rotation of the ferromagnetic object 102, adjacent to which is a recessed portion 102b, depressed from the raised portions 102a. Both the raised portion 102a (i.e., thread) and the depressed portion 102b can be in the form of respective helical structures surrounding the rotation axis of the ferromagnetic object 102. Thus, the thread 102a can be one continuous structure surrounding the ferromagnetic object 102 and the depressed portion 102b can also be one continuous structure surrounding the ferromagnetic object 102. However, in other embodiments, the thread 102a and or the depressed portion 102b can be discontinuous. In some embodiments there can be more than one thread 102a and/or more than one depressed portion 102b.

While the thread 102a and the depressed portion 102b are shown to have substantially flat helical surfaces, in other embodiments, the thread 102a and/or the depressed portion 102 can be non-flat. While a side surface 102c between the thread 102a and the depressed portion 102b is shown to have a ninety degree angle relative to the flat helical surfaces, in other embodiments, the side surface 102c forms a different angle or different angles with respect to the flat helical surfaces.

As used herein, the term "pitch" is used to describe a distance 102d, 102e between two adjacent centers of the thread 102a (the centers aligned parallel to the x-axis), or a distance between two adjacent centers of the depressed portion 102b (the centers parallel to the x-axis).

Examples of magnetic field sensors are described more fully below in conjunction with FIGS. 2 and 3. However, let it suffice here to say that the magnetic field sensor 104 can include a magnet 106, a lead frame 110, and a package 108 surrounding at least the lead frame 110. The magnetic field sensor 104 can also include a substrate having magnetic field sensing elements and an electronic circuit disposed thereon, which are described in conjunction with subsequent figures below.

The magnetic field sensor 104 can be a back-biased magnetic field sensor responsive to a magnetic field generated by the magnet 106. More particularly, the magnetic field sensor 104 can be responsive to the magnetic field generated by the magnet 106 as experienced at a position of the magnetic field sensor 104 as the target object 102 takes on different rotation angle or otherwise rotates about its axis. Thus, the magnetic field sensor 104 can be an angle sensor or a rotation sensor.

Figure 2:
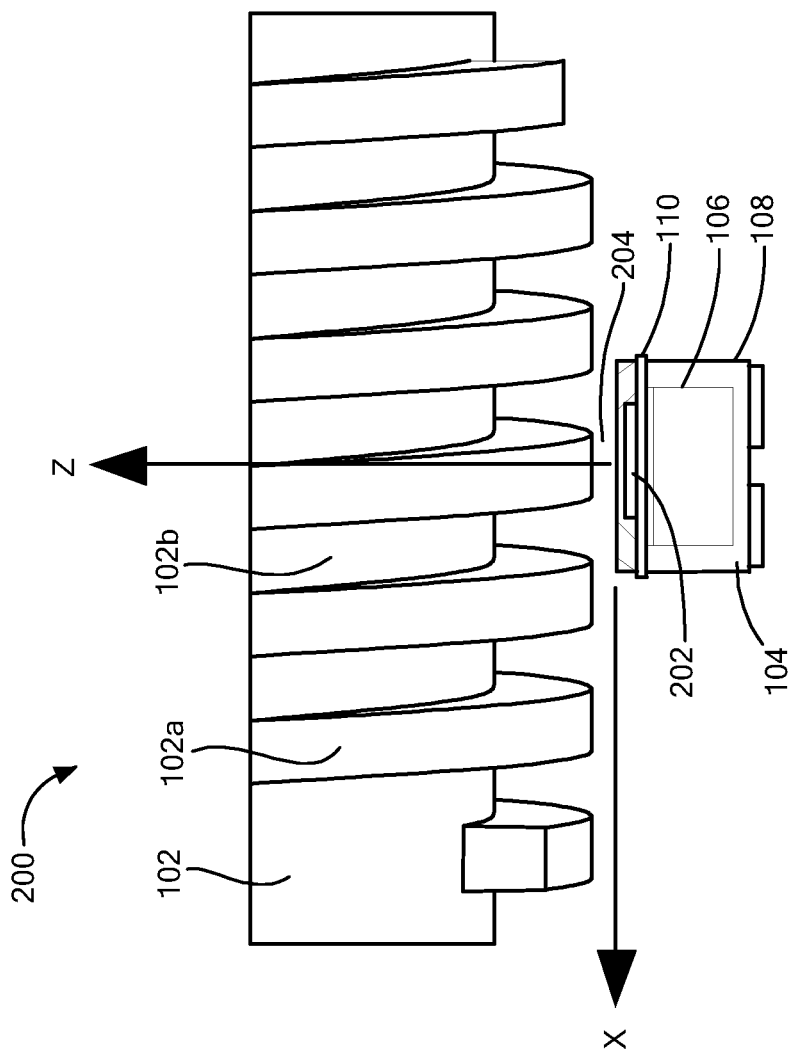
FIG. 2 is a pictorial showing a system having a ferromagnetic object capable of rotating, and a side view of a magnetic field sensor proximate to the ferromagnetic object.

Referring now to FIG. 2, in which like elements of FIG. 1 have like reference designations, a system 200 liked the system 100 above and having the magnetic field sensor 104 can also include a substrate 202, for example, a semiconductor substrate disposed within the magnetic field sensor 104. A side view of the magnetic field sensor 104 is shown. Upon the substrate 202 can be disposed a plurality of magnetic field sensors shown more clearly in conjunction with FIG. 4 below.

The system 200 can include an air gap 204 between the magnetic field sensor 104 and the threads 102a of the target object 102. More particularly, as used herein, the term "air gap" refers to a distance between a proximate surface of the threads 102a and magnetic field sensing elements disposed upon the substrate 202, the distance in a direction perpendicular to the rotation axis of the target object 102.

Figure 3:
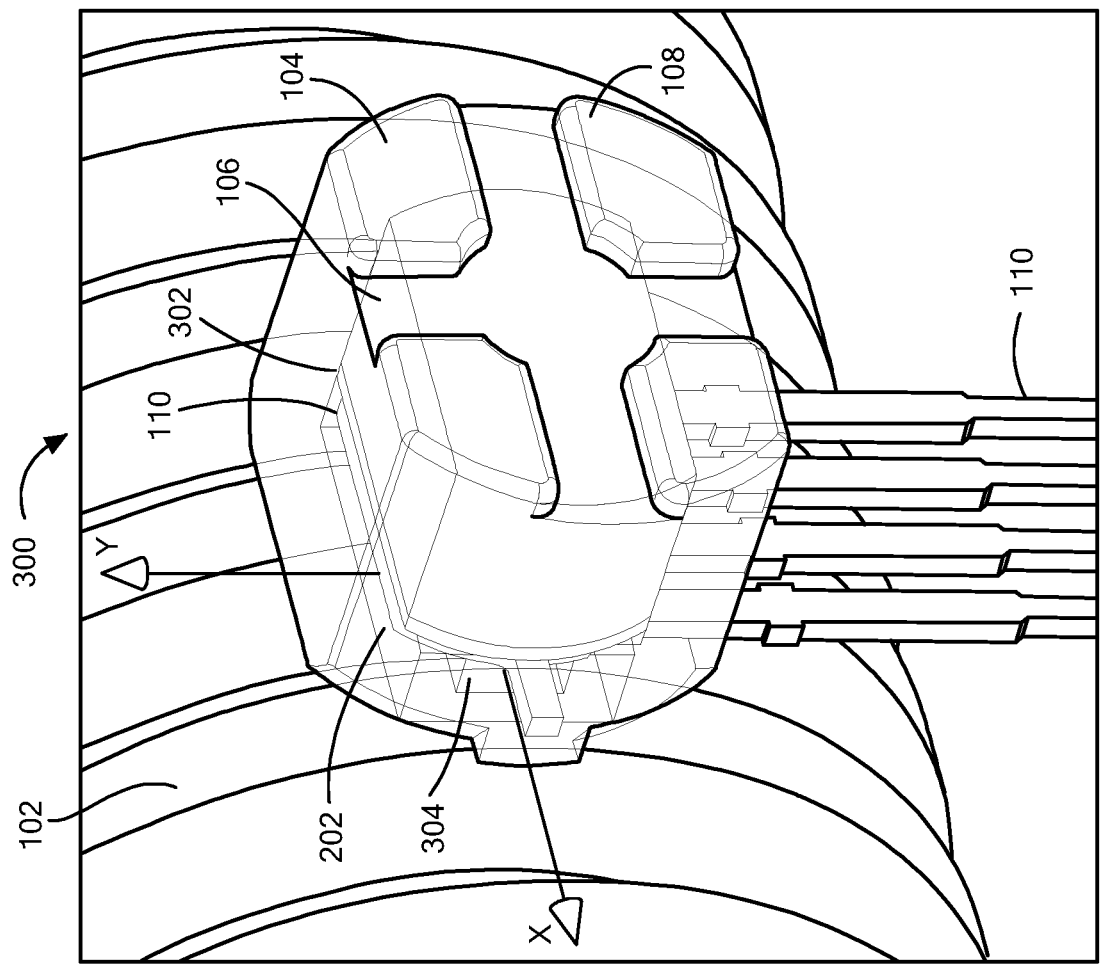
FIG. 3 is a perspective drawing showing a system having a ferromagnetic object capable of rotating, and a magnetic field sensor proximate to the ferromagnetic object.

Referring now to FIG. 3, in which like elements of FIGS. 1 and 2 are shown having like reference designations, a system 300 like the systems 100 and 300 above can include the magnetic field sensor 104 having a bonding material 302 disposed to bond the magnet 106 to the lead frame 110. A perspective view of the magnetic field sensor 104 is shown.

The substrate 202 can include a plurality of magnetic field sensing elements, but here is shown one of a plurality of magnetic field sensing elements for clarity.

Figure 4:
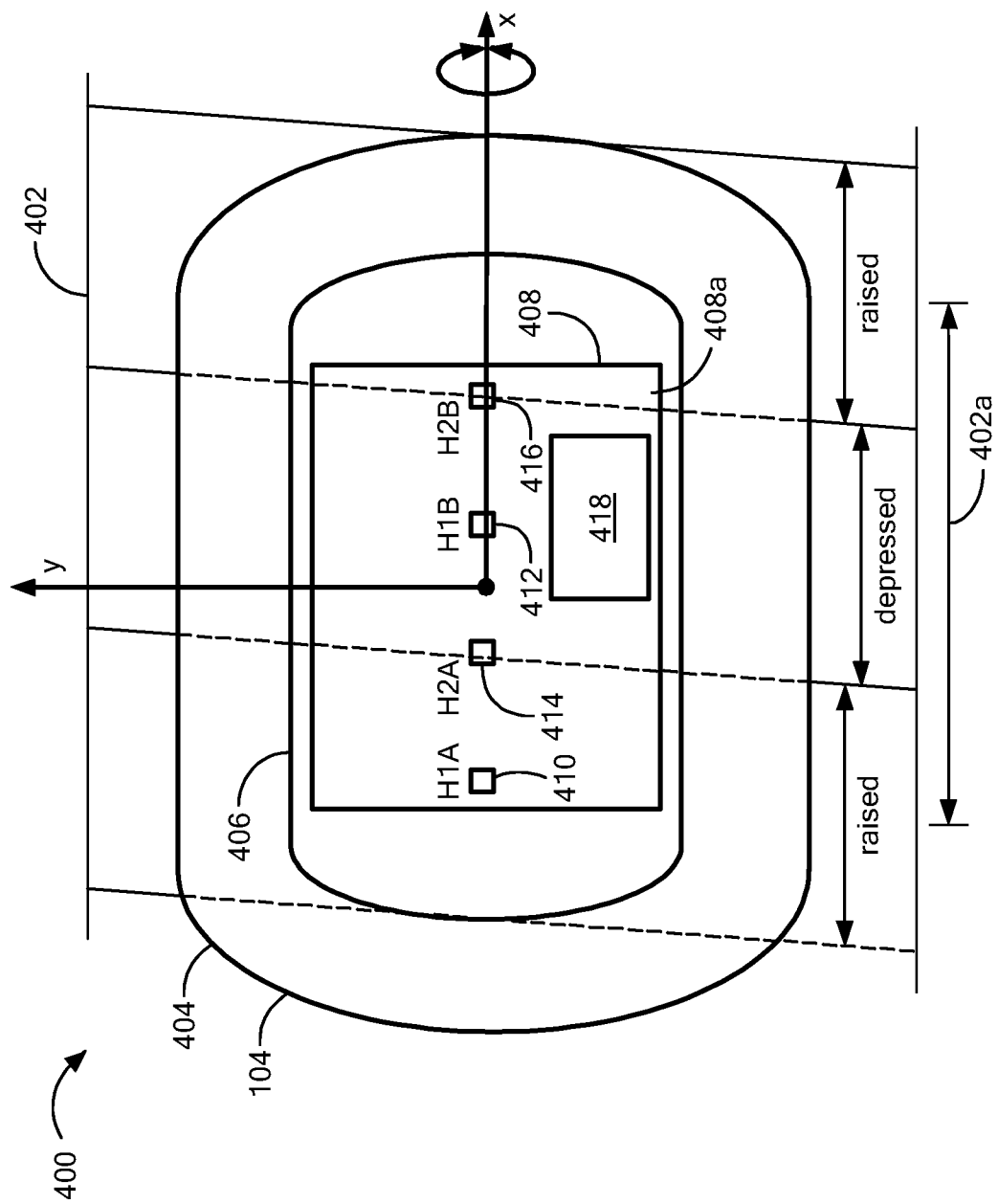
FIG. 4 is block diagram showing aspects of a ferromagnetic object and a magnetic field sensor having a substrate with magnetic field sensing elements and a further electronic circuit disposed thereon.

Referring now to FIG. 4, system 400 like the systems 100, 200, and 300 above can include a magnetic field sensor 404 disposed proximate to a ferromagnetic object 402. The ferromagnetic object 402 can have a helical (i.e., spiral) raised structure (i.e., thread) proximate a to a depressed structure, both of which are described above in conjunction with FIG. 1. The thread can have a pitch 402a.

The magnetic field sensor 404 can include a magnet 406 disposed over a substrate 408. A package 404, for example, a plastic package, can surround the aforementioned elements.

It should be clear that elements of FIG. 4 have counterpart elements described above in conjunction with FIGS. 1-3.

A first magnetic field sensing element 410, a second magnetic field sensing element 412, a third magnetic field sensing element 414, and a fourth magnetic field sensing element 416 can be disposed upon or within a major surface 408a of the substrate 408.

A separation between the first and second magnetic field sensing elements 410, 412 is selected to be within fifty percent of half of the pitch 402a of the ferromagnetic object 402. Likewise, a separation between the third and fourth magnetic field sensing elements 414, 416 is selected to be within fifty percent of half of the pitch 402a of the ferromagnetic object 402. In some other embodiments, a separation between the first and second magnetic field sensing elements 410, 412 is selected to be within twenty percent of half of the pitch 402a of the ferromagnetic object 402. Likewise, in some other embodiments, a separation between the third and fourth magnetic field sensing elements 414, 416 is selected to be within twenty percent of half of the pitch 402a of the ferromagnetic object 402

A separation between the second and third magnetic field sensing elements 412, 414 is selected to be within twenty percent of one quarter of the pitch 402a. In some other embodiments, a separation between the second and third magnetic field sensing elements 412, 414 is selected to be within five percent of one quarter of the pitch 402a. Separations between magnetic field sensing elements described herein can be separations between centers of the magnetic field sensing elements.

The above separations result in particular phases of signals resulting from the first, second, third and fourth magnetic field sensing elements 410, 412, 414, 416. These phase are described more fully below in conjunction with FIG. 6.

The first, second, third, and fourth magnetic field sensing elements 410, 412, 414, 416 can be arranged along a straight line. However, in other embodiments, the first and second, magnetic field sensing elements 410, 412 can be arranged along a first straight line, and the third and fourth magnetic field sensing elements 414, 416 can be arranged along a second straight line different than the first straight line. In some embodiments, the first and second straight lines can be parallel to each other.

In some embodiments, the first, second, third, and fourth magnetic field sensing elements 410, 412, 414, 416 can be planar Hall elements, responsive to magnetic fields perpendicular to the major surface 408a of the substrate 408. However, in other embodiments, the first, second, third, and fourth magnetic field sensing elements 410, 412, 414, 416 can be vertical Hall elements or magnetoresistance elements, responsive to magnetic fields parallel to a major surface 408a of the substrate 408.

The magnetic field sensor 404 can also include an electronic circuit 418 disposed upon the major surface 408a of the substrate 408. The electronic circuit 418 can receive signals generated by the first, second, third, and fourth magnetic field sensing elements 410, 412, 414, 416 and can process the signals to generate a signal indicative of at least an angle of rotation of the ferromagnetic object 402. In some embodiments, the signal generated by the electronic circuit 416 can also be indicative of one or more of a speed of the rotation, a direction of the rotation, and/or a turns count value, the turns count value indicative of a quantity of full rotations of the ferromagnetic object.

Figure 5:
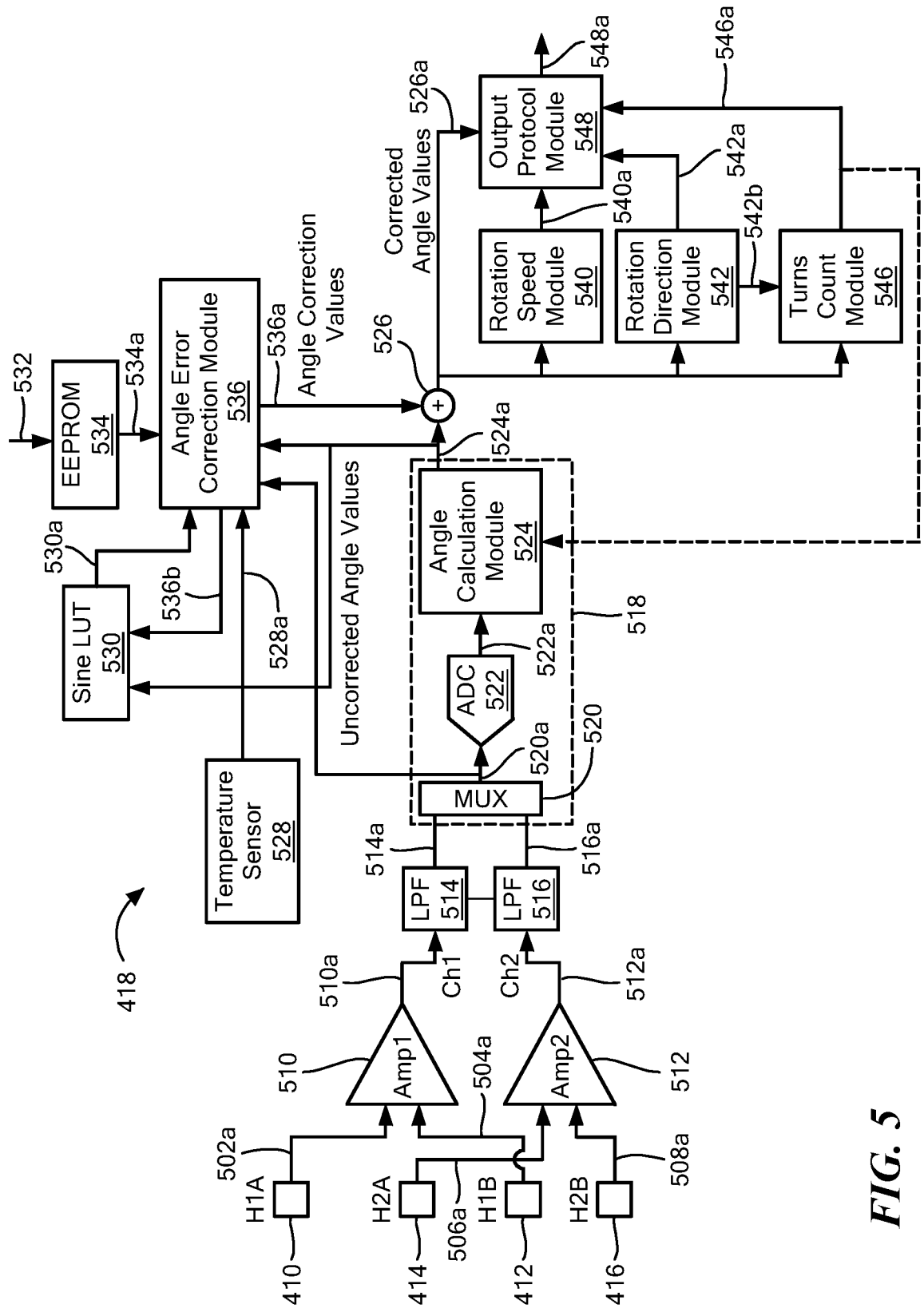
FIG. 5 is a block diagram showing magnetic field sensing elements and a further electronic circuit that can be within any of the magnetic field sensors of FIGS. 1-4, wherein the magnetic field sensor can include a EEPROM memory for storing a correction coefficient table.

Referring now to FIG. 5, in which like elements of FIG. 4 are shown having like reference designations, a magnetic field sensor 500 includes the first, second, third, and fourth magnetic field sensing elements 410, 412, 414, 416, respectively, which are operable to generate the first, second, third, and fourth magnetic field signals 502a, 504a, 506a, 508a, respectively.

A first differential amplifier 510 can be couped to the first and second magnetic field signals 502a, 504a. A second differential amplifier 512 can be couped to the third and fourth magnetic field signals 506a, 508a. The first differential amplifier 510 can be operable to generate a first amplified signal 510a and the second differential amplifier 512 can be operable to generate a second amplified signal 512a.

Here, the first, second, third, and fourth magnetic field signals 502a, 504a, 506a, 508a, are shown to be single ended signals. However, it should be appreciated that the first, second, third, and fourth magnetic field sensing elements 410, 412, 414, 416 can generate differential signals, in which case, there can be differential amplifiers coupled between the first, second, third, and fourth magnetic field sensing elements 410, 412, 414, 416 and the first and second differential amplifiers 510, 512, as will be understood.

Advantages of differential arrangements include a reduction of a response to undesirable external stray magnetic fields.

A first low pass filter 514 can be coupled to the first amplified signal 510a and a second low pass filter 516 can be coupled to the second amplified signal 512a. Corner frequencies of the first and second low pass filters 514, 516 can be selected in accordance with highest frequencies of the amplified signal 510a, 512a, which can be related to a maximum speed of rotation of the ferromagnetic object 102 of figures above.

The first and second low pass filters 514, 516 can be operable to generate first and second filtered signal 514a, 516a, respectively.

A module 518 can include a multiplexer 520 coupled to the first and second filtered signals 514a, 516a. The multiplexer 520 can be operable to generate a time multiplexed signal 520a, having alternating sequential samples of the filtered signals 514a, 516a.

An analog-to-digital converter 522 (ADC) can receive the time multiplexed signal 520a and can be operable to generate a corresponding digital time multiplexed signal 522a having multi-bit digital samples representative of the first and second filtered signal 514a, 516a.

An angle calculation module 524 can be coupled to the digital time multiplexed signal 522a and can be operable to generate one or more uncorrected angle values 522a indicative of a respective one or more angles of rotation of the ferromagnetic object 102 but with errors described more fully below. To this end, the angle calculation module 524 can be configured to compute an arctangent of a ratio of the first and second filtered signals 514a, 516a. In some embodiments, the angle calculation module 524 can compute an arctangent using a CORDIC algorithm.

In operation, the one or more uncorrected angle values 524a can have a respective one or more error components. The one or more error components are described more fully below in conjunction with FIG. 7. Let it suffice here to say that the one or more error components represent angle error components that cause the one or more uncorrected angle values 524a to not be perfectly representative of true angles of the angle and/or rotation of the ferromagnet object 102.

An angle error correction module 536 is coupled to receive the one or more uncorrected angle values 524a and configured to generate a respective one or more angle correction values 536a representative of the above one or more error components of the one or more uncorrected angle values 524a.

A combining module 526, here shown to be a summing module but which could be a differencing module, can be coupled to receive the one or more uncorrected angle values 522a, coupled to receive the one or more angle correction values 536a, and configured to generate a respective one or more corrected angle values 526a. The one or more corrected angle values 526a can have angle error components smaller than above one or more error components of the one or more uncorrected angle values 524a. Thus, the one or more corrected angle values 526a are more accurately representative of the true angle of the ferromagnetic object 102.

The angle error correction module 536 can also be coupled to receive a temperature signal 528a generated by a temperature sensor 528. The angle error correction module 536 can also be coupled to receive sine values 530a from a sine look up table (LUT) 530. In some embodiments, the sine values 530a are representative of a sine values at a fundamental component and at a plurality of harmonics of the fundamental component. In some embodiments, the sine values 530a are representative of a sine values at the fundamental component and at one, two, three, four, five, six, seven and/or eight harmonics of the fundamental component. However, the sine look-up table 530 can provide any number of sine values representative of any number of harmonics of the fundamental component.

The fundamental component can be determined by taking measurements of the uncorrected angle values (e.g., values 524a of FIG. 5 or values 526a with no correction applied by the error correction module 536) while rotating the ferromagnetic object (screw) through three hundred sixty degrees and identifying the fundamental component of the error function.

The sine lookup table 530 can be coupled to receive, and can be indexed in accordance with, the one or more uncorrected angle values 524a and in accordance with so-called interpolated phase values 536b generated by angle error correction module 536. Interpolated phase values 536b are further described below in conjunction with FIG. 8.

The magnetic field sensor 500 can be coupled to receive a control signal 532 from outside of the magnetic field sensor 500. In particular, an electrically erasable programmable read-only memory (EEPROM) 534 can be coupled to receive the control signal 532 having one or more correction coefficients, and can be configured to supply the one or more correction coefficients to the angle error correction module 536 as correction coefficients 534a.

Figure 8:
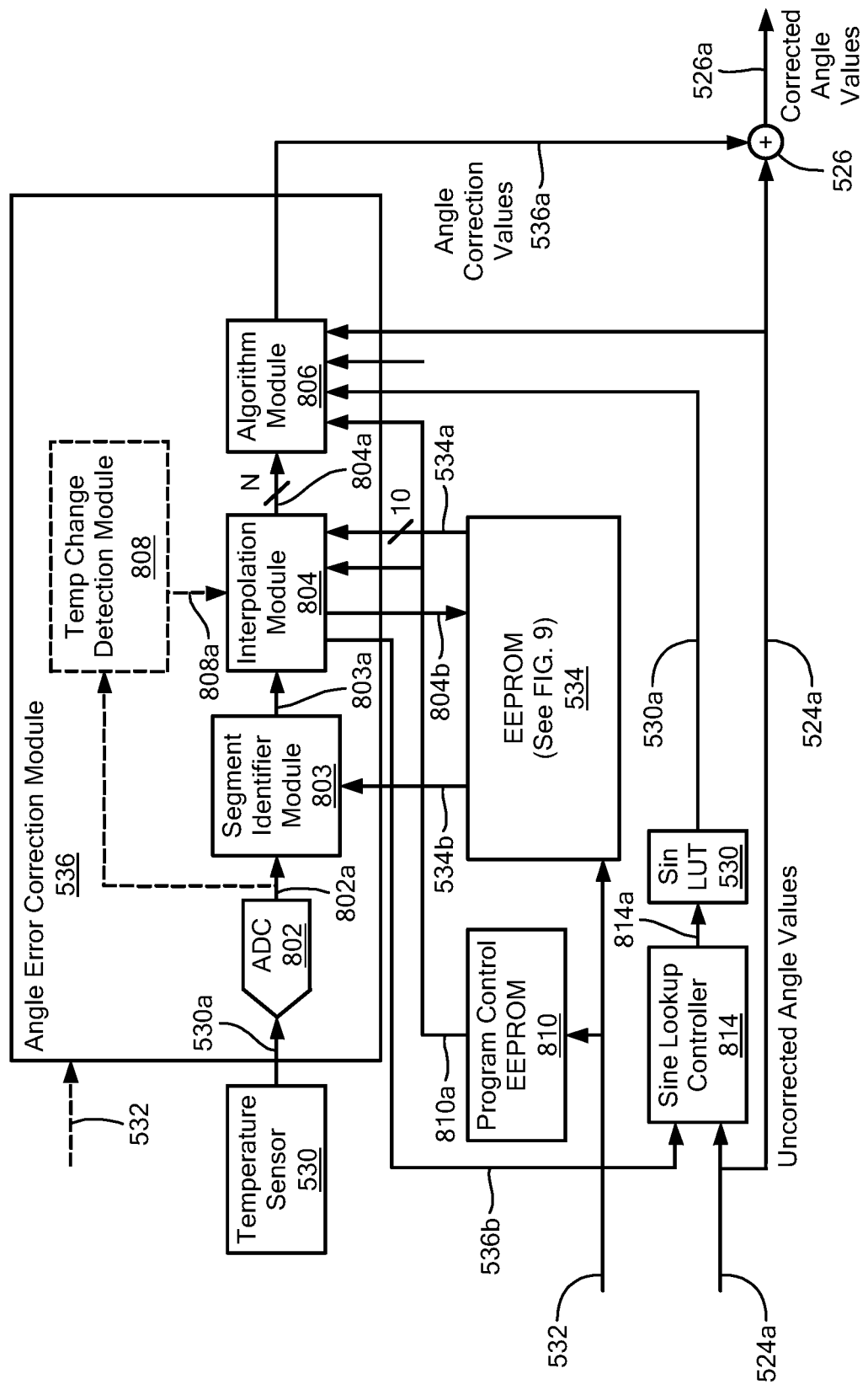
FIG. 8 is a block diagram showing further details of the magnetic field sensor of FIG. 5, again showing the EEPROM of FIG. 5.

The angle error correction module 536 is described in greater detail in conjunction with FIG. 8. However, let it suffice here to say that the angle error correction module 536 is configured to use the temperature signal 528a to adjust the one or more angle correction values 536a according to the sensed temperature signal 528a.

In some embodiments, the magnetic field sensor 500 can also include a rotation speed module 540 and/or a rotation direction module 542, and/or a turns count module 546, each coupled to receive the one or more corrected angle values 526a. It will be understood that the one or more corrected angle values 526a can change, and therefore, can be representative of a rotating ferromagnetic object 102.

The rotation speed module 540 is configured to generate rotation speed values 540a indicative of a rotation speed of the ferromagnetic object 102. The rotation direction module 542 is configured to generate direction values 542a indicative of rotation directions of the ferromagnetic object 102. The turns count module 546 can also be coupled to the rotation direction values 542a and can be operable to generate turns count values 546a indicative of numbers of full three hundred sixty degree turns of the ferromagnetic object 102.

An output protocol module 548 can be coupled to receive the one or more corrected angle values 526a, the rotation speed values 540a, and/or the rotation direction values 542a. The output protocol module 548 is configured to generate an output signal 548a representative of the angle of the ferromagnetic object 102, representative of the speed of rotation of the ferromagnetic object 102, representative of the direction of rotation of the ferromagnetic object 102, and/or representative of a turns count of the ferromagnetic object 102. The output signal 134a can be provided with one of a variety of conventional formats, for example, an SPI format, a CAN format, anI2C format, or a Manchester format.

In some alternate embodiments, the turns count values 546a can be provided to the angle calculation module 524, allowing the angle calculation module 524 to calculate an angle of the ferromagnetic object 102 beyond three hundred sixty degrees.

Figure 6:
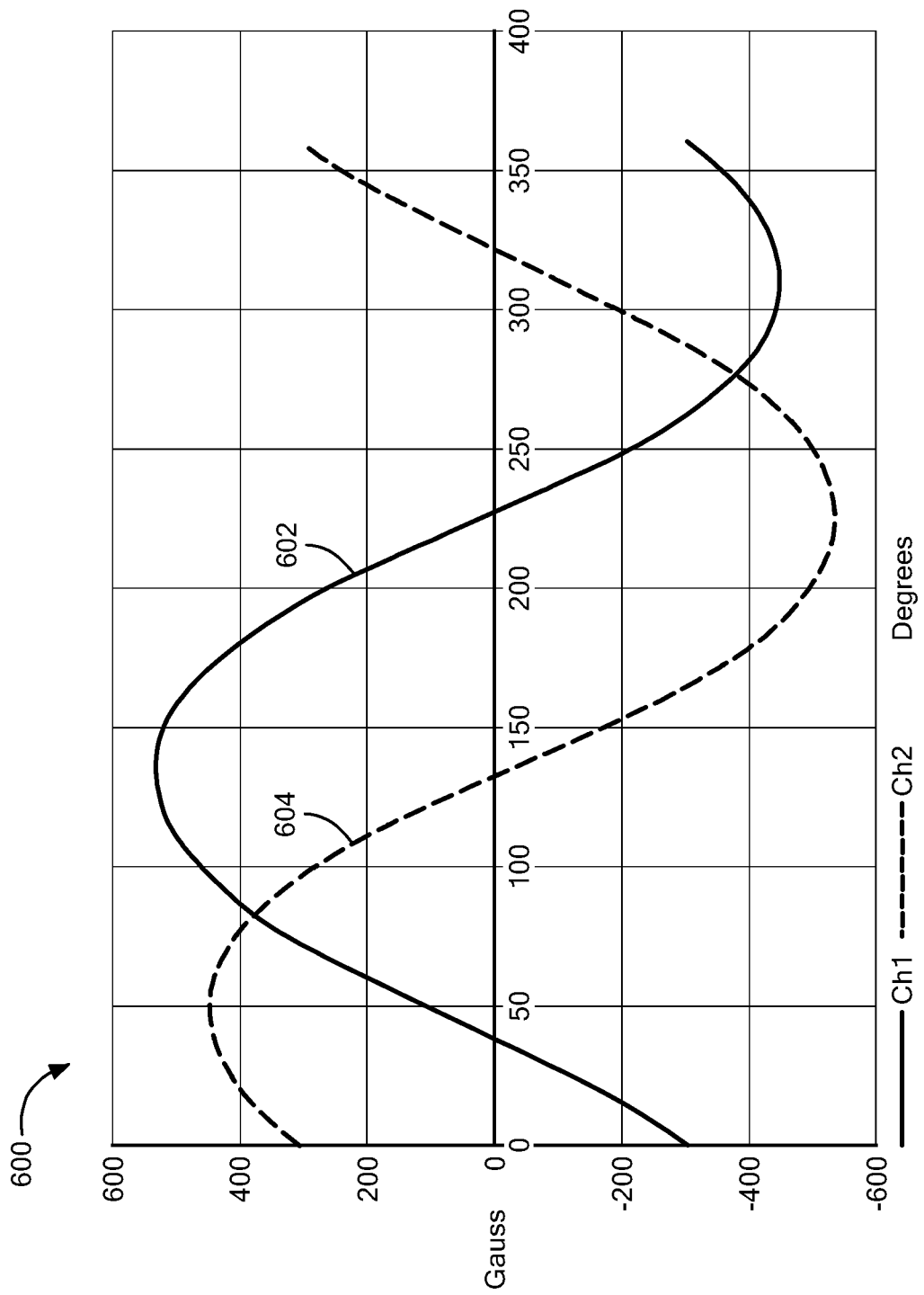
FIG. 6 is a graph showing two illustrative signals that can be generated within the magnetic field sensor of FIG. 5.

Referring now to FIG. 6, a graph 600 has a horizontal scale with units of signal phase in degrees and a vertical scale with units of magnetic field in Gauss. The signal phase is representative of angles of rotation of the ferromagnetic object 102.

A signal 602 is indicative of the first amplified signal 510a of FIG. 5, but expressed in units of Gauss, as the ferromagnetic object 102 rotates. A signal 604 is indicative of the second amplified signal 512a of FIG. 5, but expressed in units of Gauss, as the ferromagnetic object 102 rotates.

The two signals 602, 604 are about ninety degrees apart due to the above described selection of separations between magnetic field sensing elements 410, 412, 414, 416.

At any rotation angle of the ferromagnetic object 102, i.e., at one phase of the signals 602, 604, an arctangent of a ratio of the signal 602, 604 is indicative of the rotation angle. The arctangent calculation can be performed by the above-described angle calculation module 524 of FIG. 5.

The two signals 602, 604 can have different amplitudes due to different sensitivities of the above first, second, third, and fourth magnetic field sensing elements 410, 412, 414, 416. The different amplitudes result in at least part of the angle errors described above in conjunction with FIG. 5.

Other factors that contribute to the angle errors include a phase error (non-ninety degrees) between the signals 602, 604, which can result from inaccurate separations of the first, second, third, and fourth magnetic field sensing elements 410, 412, 414, 416, and also from physical and magnetic characteristics around the ferromagnetic object 102, which characteristics can change with respect to the above-described air gap 204 between the threads 102a of the ferromagnetic object 102 and the first, second, third, and fourth magnetic field sensing elements 410, 412, 414, 416.

Another factor that can contribute to the error is temperature effects upon changes of the air gap 204 and upon changes of sensitivities of the first, second, third, and fourth magnetic field sensing elements 410, 412, 414, 416.

Figure 7:
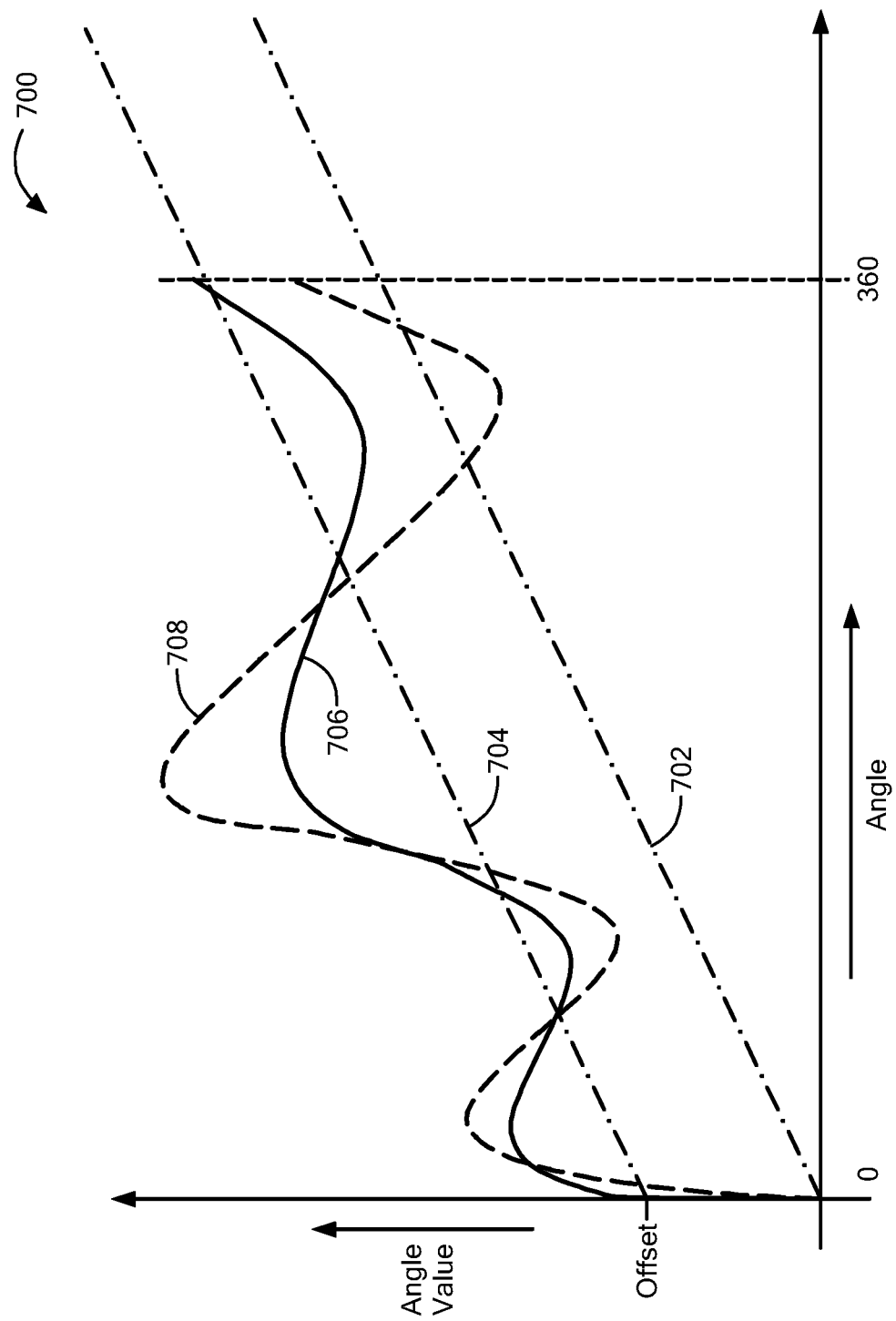
FIG. 7 is a graph showing illustrative angle errors within the magnetic field sensor of FIG. 5, but corrected by the magnetic field sensor.

Referring now to FIG. 7, a graph 700 has a horizontal axis with a scale in units of angular degrees and a vertical axis with a scale in units of value of an angle value magnitudes, for example, magnitudes of the uncorrected angle values 524a of FIG. 5

A line 702 is representative of an angle value that has no angle error. When the angle value has no angle error, the angle value is perfectly linear with respect to actual angle, i.e., the angle value is a perfect and true representation of the rotations angle of the ferromagnetic object 102.

A line 704 is representative of angle values that have only an average or DC angle error, such that all angles represented by the angle values are offset by a fixed number of degrees. The line 704 does not pass through zero.

A curve 706 is representative of angle values that have errors in representation of the true rotation angles of the ferromagnetic object 102, both average or DC errors and also errors that have a sinusoidal appearance but with harmonics therein.

A curve 708 is representative of angle values that have other errors in representation of the true angles of rotation of the ferromagnetic object 102, for example, when the magnetic field sensors described herein are exposed to a different temperature than are represented by the curve 706. Thus, the angle error correction module 536 of FIG. 5 is configured to make changes to angle correction values 536a according to at least a temperature contribution to the angle errors represented by the curves 706, 708.

The curves 706, 708 are merely illustrative and are simplified and exaggerated merely for clarity. Simulated error functions are shown in conjunction with FIG. 10, for different air gaps.

Angle errors are a difference between one of the curves 706, 708 and the line 702. Above described angle correction values, e.g., 536a of FIG. 5 can be the inverse of the angle error values, particularly if the combining module 526 is a summing module. However, if the module 526 is a differencing module, then the angle correction values 536a can be the angle error values.

As described herein, angle errors represented by the curves 706, 708 are referred to as first error characteristics, each influenced by the above-described factors.

As also described below, the angle error correction module 536 of FIG. 5 can be used to generate the angle correction values 536a, which can be used to generate the corrected angle values 526a. Other angle error curves (not shown) with lower peak to peak variation than the error curves 706, 708 can be associated with the with the corrected angle values 526a. The lower value error curves are representative of second error characteristics that are smaller than the first error characteristics.

Below it is described that the angle correction values 536a are generated by the angle error correction module 536 according to an algorithm, as opposed to according to a look up table having angle correction values at a plurality of angles of the ferromagnetic object. A memory size can be reduced by using the algorithm. However, in other embodiments, a look up table having a plurality of correction coefficients at a respective plurality of rotation angles of the ferromagnetic object 102 is also possible.

Mathematically, angle errors represented by the curves 706, 708 can be represented as:

$$\alpha_{err} = OFF + DC(T) + \sum_{n=1}^{\infty} H_{nA}(T) \cdot \sin(n\alpha + H_{nP}(T)) \tag{1}$$

where:
α=measured angle with error (see uncorrected angle values 524a of FIG. 5);
n=a variable indicative of an nth harmonic;
T=temperature measured by temperature sensor 528;

OFF=a positioning error of the ferromagnetic object 102, i.e., a mechanical misalignment of the first, second, third and fourth magnetic field sensing elements 502, 504, 506, 508 in relation to the ferromagnetic object 102 of FIGS. 1-3, which is largely independent of the temperature, T;

DC (T)=an average of DC angle error, which is a function of the temperature, T;

$H_{nA}$(T)=an amplitude of an nth-harmonic component of the angle error, which is a function of the temperature, T; and $H_{nP}$(T)=a phase of the nth-harmonic component of the angle error, which is a function of the temperature, T.

Other factors described above, other than temperature, which affect the angle error, are not considered in equation 1.

An estimated and quantized angle error (rather than non-quantized error of equation (1)) can be mathematically expressed as:

$$\alpha'_{err} = OFF + DC_q(T) + \sum_{n=1}^{\infty} H_{nA\_q}(T) \cdot \sin(n\alpha + H_{nP\_q}(T)) \quad (2)$$

where:

q stands for quantized values.

It is described below in conjunction with FIG. 5 that the angle error correction module 536 of FIG. 5 can use a set of programmable average correction coefficients, programmable amplitude correction coefficients, and programmable phase correction coefficients stored within the EEPROM 534 of FIG. 5 in an expression the same as or similar to the expression of equation (2). As described below, in some embodiments, the misalignment correction coefficient, OFF, can also be stored and used.

The angle error correction module 536 of FIG. 5 can digitally weight, in accordance with the correction coefficients, one or more normalized sine waveforms (values) (i.e., one or more harmonic values) provided by the sine LUT 148, the results of which are summed together in order to approximate the angle error according to equation (2). Thus, in some embodiments, the angle error correction module 536 of FIG. 5 can generate the angle correction values 536*a* according to equation (2).

In some embodiments, the angle correction values have the same amplitude but opposite sign from the angle error values.

In some embodiments, the error correction module 536 of FIG. 5 evaluates equation (2) using two harmonics, first and second. In some other embodiments, the error correction module 138 evaluates equation (2) with one harmonic, first or second. In some other embodiments, the error correction module 536 of FIG. 5 evaluates equation (2) with more than two harmonics, for example, first, second, third, fourth, fifth, sixth, seventh, and/or eighth harmonics. Any number of harmonics can be used, but a range of from one to twenty harmonics is desired.

In some other embodiments, the error correction module 536 of FIG. 5 evaluates equation (2) also using the average value, $DC_q(T)$. In some other embodiments, the error correction module 536 of FIG. 5 evaluates equation (2) using only the average value, $DC_q(T)$, without any sine functions or harmonics, and with or without the misalignment correction coefficient, OFF. In some embodiments, the error correction module 536 of FIG. 5 evaluates an equation different from equation (2), but having correction coefficients that can be stored in the EEPROM 534.

As described above in conjunction with FIG. 5, the combining module 526 is operable to combine the angle correction values 526*a* (i.e., opposite of the estimated error according to equation (2)), which are temperature dependent, with the uncorrected angle values 524*a*. Thus, for each temperature $T_i$, the estimated error, $\alpha'_{err}$ for measured angle α according to equation (2) can be digitally subtracted from (or added to) the sensed (i.e., measured) angle, α, (i.e., the uncorrected angle value 524*a* of FIG. 5), which contains an error represented by the curves 706 or 708 of FIG. 7.

As temperature varies, each harmonic component of the angle error represented by equation (2) can change independently in amplitude and phase. As described below in conjunction with FIGS. 8 and 9, in some embodiments, angle error variations as a function of temperature of each parameter (average, and also amplitude and phase of each harmonic component) are approximated between pairs of stored average, amplitude, and phase values using a piecewise-linear interpolation.

Referring now to FIGS. 8 and 9, in which like elements of FIG. 5 are shown having like reference designations, the angle error correction module 536 can be coupled to the EEPROM 534. The EEPROM 534 is configured to store a plurality of correction coefficients or values associated with so-called temperature segments and shown in FIG. 9.

As used herein, the term "temperature segment" is used to describe one of a plurality of temperature ranges, each temperature range bounded by a pair of temperatures. Examples shown herein and described below use four such temperature segments, a first temperature segment adjacent to the second temperature segment, the second temperature segment adjacent to a third temperature segment, and a fourth temperature segment adjacent to the third temperature segment, in ascending order of temperatures. In some embodiments the temperature segments overlap, and, in other embodiments, there are temperature spaces between the temperature segments. In some embodiments, each temperature segment spans the same number of degrees of temperature, and in other embodiments the temperature segments span different numbers of degrees of temperature. For example, in some embodiments the second and third temperature segments can each have wider temperature span than the first and fourth segments.

The EEPROM 534 can store therein a plurality of temperature values, e.g., T0, T1, T2, T3, T4, T5, representative of boundaries of four temperature segments.

The EEPROM 534 can also store a plurality of correction coefficients (see, e.g., FIG. 9). For example, the EEPROM 534 can store five average correction coefficients, Avg m0, Avg m1, Avg m2, Avg m3, Avg m4. Each of the five average correction coefficients is representative of an average value at a different respective temperature corresponding to temperatures at the boundaries of the four temperature segments.

In some embodiments, the EEPROM 534 of FIG. 5 can also store N harmonic amplitude correction coefficients, at each one of five temperatures.

In some embodiments, the coefficient table EEPROM 534 FIG. 5 can also store N harmonic phase correction coefficients, at each one of the five temperatures.

As described above, in one illustrative example, eight harmonics can be used. However, different numbers of harmonics can also be used.

In some embodiments, all of the stored correction coefficients and values can be programmed into the EEPROM 534, for example, by way of the control signal 532. To this end, in some embodiments, in order to identify the correction coefficients, samples of one or more error functions like the error functions 706, 708 (see also FIG. 10) can be generated by using the magnetic field sensor 400, i.e., rotating the ferromagnetic object 402 placed at a desired air gap next to the magnetic field sensor 400, but without any correction yet applied. The samples of the one or more error functions can be subjected to an FFT process or the like, and for which rotation angle is a variable rather than time, which is normally used in an FFT. Amplitude and phases of harmonics of the error function can result, i.e., correction coefficients. The number of samples of the error function within a rotation of the ferromagnetic object 402 is selected in accordance with a factor of the highest harmonic desired (corresponding to angle increments as the ferromagnetic object is rotated), which highest harmonic is related to the ultimate the accuracy desired. Samples of the error function can be generated for different temperatures associated with the different temperature segment boundaries.

As described above, while four temperature segments and associated temperatures and coefficients are shown, in other embodiments, there can be more than four or fewer than four temperature segments, and more than or fewer than forty five stored correction coefficients in accordance with a number of temperature segments. Also, in accordance with that described above, while correction coefficients representative of temperatures, coefficients representative of average values, coefficients representative of amplitude and phase values of N harmonics are shown, in other embodiments, fewer than those coefficients can be stored and used.

In some embodiments the four temperature segments have equal temperature spans. However, in other embodiments, the four temperature segments can have different temperature spans.

The angle error correction module 538 can include an analog-to-digital converter 802 coupled to receive the temperature signal 530a from the temperature sensor 530. The analog-to-digital converter 802 is configured to generate a converted signal 802a, which is a digital signal representative of the temperature of the magnetic field sensor 104.

The angle error correction module 536 can include a segment identifier module 803 coupled to receive the digital temperature signal 802a and configured to identify one of a plurality of temperature segments in which the digital temperature signal 802a lies. To this end, the segment identification module 803 can receive information 534b about the stored temperature segments, e.g., temperature boundaries T0, T1, T2, T3, T4, T5 of four stored four temperature segments, from the EEPROM 534. The segment identification module 803 is operable to identify between which two adjacent temperatures the digital temperature signal 530a lies, i.e., within which one of the four temperature segments the digital temperature signal 802a lies. In accordance with the identified temperature segment, the segment identification module 803 is operable to generate a segment identifier signal 803a representative of the identified temperature segment.

The angle error correction module 536 can also include an interpolation module 804 coupled to receive the digital temperature signal 802a and coupled to receive the segment identifier signal 803a. The interpolation module 804 is also coupled to receive identified correction coefficients 534a, identified by the segment identification module 803 and described more fully above and below.

In accordance with the segment identifier signal 803a, the interpolation module 804 is configured to generate a correction coefficient request signal 804b received by the EEPROM 534. In response to the correction coefficient request signal 804b, the EEPROM 534 provides a plurality of correction coefficients 534a associated with the temperature boundaries of the identified temperature segment. It will be understood that identification of the temperature segment results in selection of a plurality of correction coefficients, N or more correction coefficients, at the temperature of each one of the boundaries of the identified temperature sites.

In some embodiments, the correction coefficients 534a each have ten bits. However, in other embodiments, each one of the correction coefficients 534a have any number of bits from two to twelve.

The interpolation module 804 is operable to interpolate between pairs of the identified and received correction coefficients 534a. For example, referring briefly again to FIG. 9, if the digital temperature signal 802a is representative of a temperature of two hundred fifty degrees, and if the pair of average value correction coefficients, e.g., Amp 1m2, Amp 1m3 are correction coefficients associated with a temperature segment spanning from two hundred degrees to three hundred degrees (i.e., a third temperature segment in which the digital temperature signal 802a lies), then it should be apparent that the interpolation module can interpolate between the two correction coefficients, Amp 1m2, Amp 1m3, to arrive at an interpolated correction coefficient, which can be used in equation (2) Similar interpolations can be performed by the interpolation module 804 between other ones of the pairs of correction coefficients associated with the third temperature segment to generate a plurality of interpolated correction coefficients 804a.

In some embodiments, the interpolation module 804 can perform linear interpolations. In other embodiments the interpolation module 804 can perform nonlinear interpolations. In some embodiments, the interpolation module 804 can perform a type of interpolation appropriate for a temperature span of a temperature segment. For example, if a temperature span of the identified temperature segment is relatively wide, then the interpolation module 804 can perform a linear interpolation where the digital temperature signal 802a falls within that wide temperature segment. Conversely, if a temperature span of the identified temperature segment is narrow, which may be indicative of a rapidly changing error characteristic (see, e.g., curve 706), then the interpolation module 804 can perform a nonlinear interpolation when the digital temperature signal 802a falls within that narrower temperature segment.

The angle error correction module 536 can also include an algorithm module 806 coupled to receive the interpolated correction coefficients 804a and configured to use the interpolated correction coefficients 804a in an algorithm, for example, an algorithm that uses equation (2) above. As described above, the algorithm module 806 can employ equation (2) with any number of harmonics and with or without the average or DC correction coefficients.

The algorithm module 806 is configured to generate the angle correction values 536a.

As described above in conjunction with FIG. 5, the combining module 526 can be coupled to receive the angle correction values, coupled to receive the uncorrected angle values 524a, and configured to combine the two values to generate the corrected angle values 526a that are more accurate and have smaller (i.e., a second) error components smaller than the first error components of the uncorrected angle values 524a The sine look-up table 530 is described above in conjunction with FIG. 5. The sine lookup table 530 can provide harmonic sine values 530a to the algorithm module 806 for use in evaluating equation (2) above.

A sine lookup controller 814 can be coupled to receive the uncorrected angle values 524a and coupled to receive interpolated phase values 536b from the interpolation module. It will be apparent from equation (2) that both of these values are required in order to know how to index into the sine lookup table 530. In particular, the parameter $\sin(n\alpha+H_{nP\_q}(T))$ of equation (2) requires an index including both the measured (i.e., uncorrected) angle, $\alpha$, and an interpolated phase, $H_{nP\_q}(T)$. Recall that the parameter n is a harmonic number.

In some embodiments, the angle error correction module 536 can optionally include a temperature change detection module 808 coupled to receive the digital temperature signal 802a and configured to identify if the digital temperature signal 802a is representative of a change in temperature or representative of no change temperature. The temperature change detection module 808 can be configured to generate a control signal 808a, also indicative of a change in temperature or indicative of no change in temperature. Accordingly, in some embodiments, the interpolation module 804 can perform the above described interpolations and provide new interpolated correction coefficients 804a to the algorithm module 806 only when the control signal 808a is indicative of a change in temperature. At other times, the algorithm module 806 can use interpolated correction coefficients that were previously calculated.

In some embodiments a program control EEPROM 810 can be coupled to receive the control signal 532. The program control EEPROM 810 can be coupled to one or more of the interpolation module 808 or the algorithm module 806. In some embodiments, by way of the control signal 532, a user can program the magnetic field sensor 104 of FIGS. 1-5 to use a selected type of interpolation within the interpolation module. In some embodiments, by way of the control signal 532, a user can program the magnetic field sensor 104 to use a selected type of algorithm within the algorithm module 806. Thus, in some embodiments, the magnetic field sensor 104 uses equation (2) as the algorithm, and in other embodiments, the magnetic field sensor 104 uses a different algorithm.

Referring again to FIG. 9, correction coefficients can be different for different air gaps, index m, (see, e.g., air gap 204 of FIG. 2). However, in conjunction with FIG. 10, it is shown that, for air gaps between one millimeter and two millimeters, the uncorrected angle errors are similar.

Figure 10:
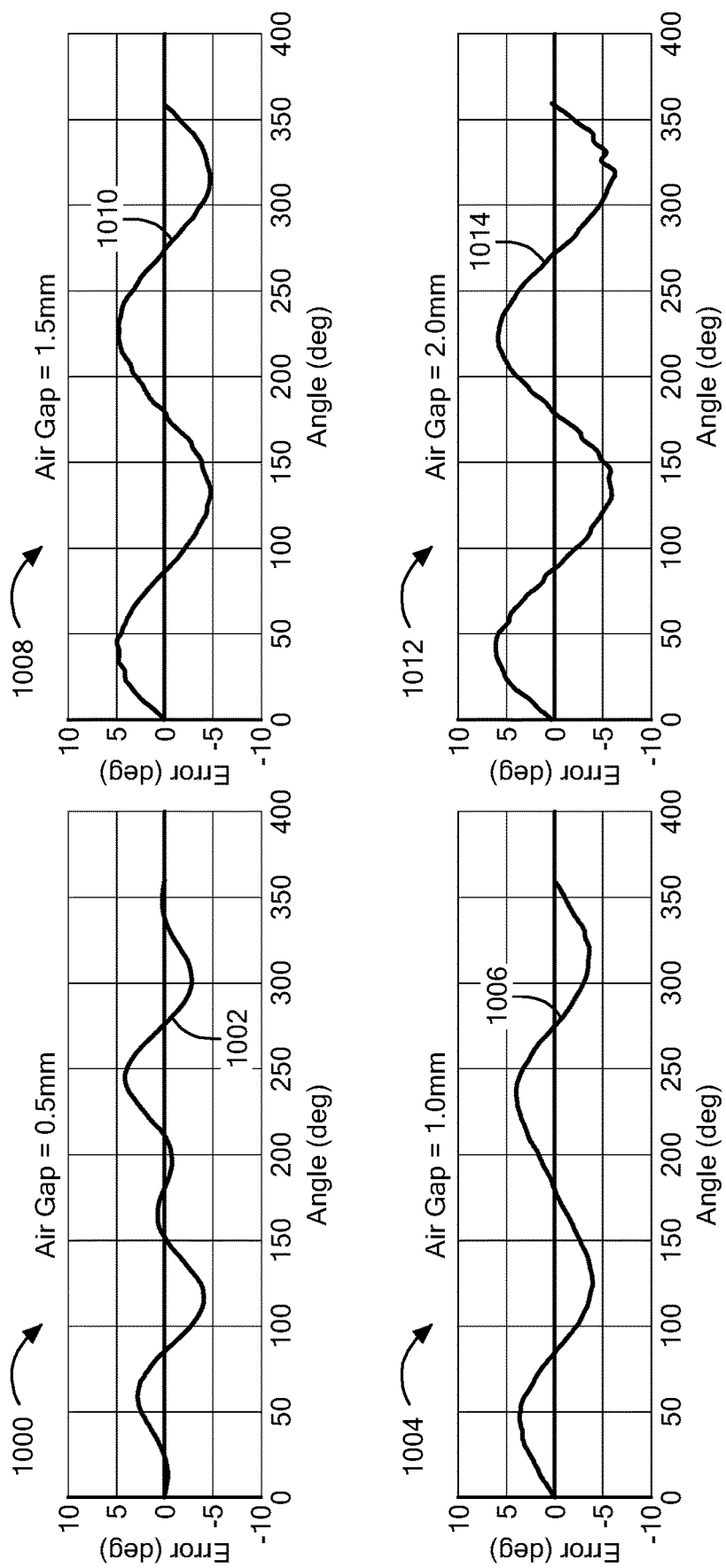
FIG. 10 is a set of graphs showing an example of angle read errors for different air gaps between the magnetic field sensors and the ferromagnetic objects.

Referring now to FIG. 10, graphs 1000, 1004, 1008, 1002 each have respective horizontal axis with scales representative of rotation angle of the ferromagnetic object 102 above in units of degrees and vertical axis with scales representative of uncorrected angle errors in the uncorrected angle signal 524a of FIG. 5. A curve 1002 is a magnetically simulated representation of angle errors for an air gap (204 of FIG. 2) of 0.5 mm. A curve 1006 is a magnetically simulated representation of angle errors for an air gap of 1.0 mm. A curve 1010 is a magnetically simulated representation of angle errors for an air gap of 1.5 mm. A curve 1014 is a magnetically simulated representation of angle errors for an air gap of 2.0 mm.

It can be seen that the uncorrected angle errors are similar for air gaps of 1.0 mm to 2.0 mm. Thus, in some embodiments, correction coefficients 534a stored in the EEPROM 534 can be the same for air gaps of 1.0 mm to 2.0 mm. In some arrangements, such correction coefficients 534a can be generated using magnetic simulations.

To afford greater accuracy, in some arrangements, the correction coefficients 534a stored in the EEPROM 534 can be generated during manufacturing, using a manufacturing air gap and a manufacturing ferromagnetic object 102. In some arrangements, the correction coefficients 534a stored in the EEPROM 534 can be generated after the magnetic field sensor 104 and target object are in position as used in operation, using the actual air gap and the actual ferromagnetic object 102.

Figure 11:
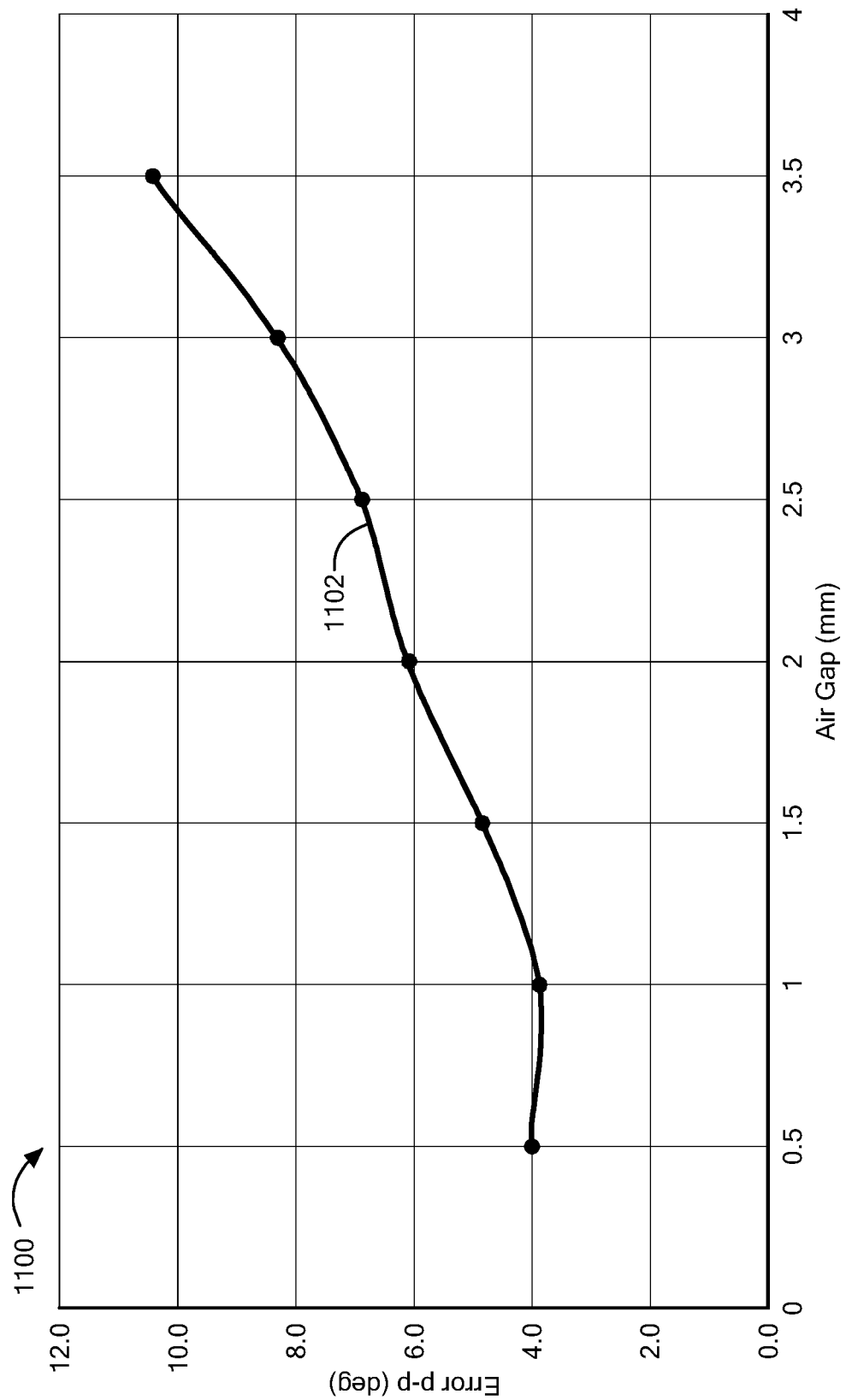
FIG. 11 is a graph showing a relationship between peak-peak angle error for different air gaps for any of the magnetic field sensor described in figures above.

Referring now to FIG. 11, a graph 1100 has a horizontal axis representative of air gaps (e.g., 204 of FIG. 4) in units of millimeters and a vertical axis representative of uncorrected peak-to-peak angle error in degrees. The peak-to-peak uncorrected angle error is like peak to peak values of the curves of FIG. 10.

From the graph 1100, it will be appreciated that the uncorrected angle error increases at higher air gaps. As described above, air gaps of 1 mm to 2 mm are desirable, but other air gaps are also possible.

Referring now to FIG. 12, a chart shows values generated by a magnetic simulation using a representative ferromagnetic object tin the form of a screw and for different air gaps. Values in the chart are representative of simulated correction coefficients (see FIG. 9) that can be used in conjunction with equation (2) above, some of which, or all of which, can be stored in the EEPROM 534.

The chart shows error (or correction) coefficients for eight harmonics of an error function (see, e.g., FIG. 7) and for five different air gaps. No temperature variations are shown. In the chart, designation "1", e.g., A1/Ph1, is indicative of the fundamental component of the above-described error function.

From the chart, it will be apparent that the first three harmonics are most important, i.e., the fundamental component (amplitude and phase) A1/Ph1 along with A2/Ph2, A3/Ph3. Furthermore, for more precision, seven harmonics could be used. The eighth harmonic has an amplitude of nearly zero and is less important.

In simulations, using an infinite number of harmonics would result in zero simulated error when the correction is applied by techniques described above. Use of seven harmonics should result in nearly zero simulated error for reasons described above.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A system for sensing an angle of rotation of a ferromagnetic object having a rotation axis and a helical screw thread, the helical screw thread having a pitch defined by a distance between centers of two adjacent ridges of the helical screw thread, the system comprising a magnetic field sensor comprising:

a substrate;

a back bias magnet disposed proximate to the substrate and configured to generate a DC magnetic field;

first and second magnetic field sensing elements disposed upon the substrate and disposed proximate to the ferromagnetic object, the first and second magnetic field sensing elements having a separation selected in accordance with a first factor times the pitch, the first and second magnetic field sensing elements configured to generate first and second magnetic field signals, respectively, in response to the DC magnetic field and the ferromagnetic object;

third and fourth magnetic field sensing elements disposed upon the substrate and disposed proximate to the ferromagnetic object, the third and fourth magnetic field sensing elements having a separation selected in accordance with the first factor times the pitch, the third magnetic field sensing element separated from the first magnetic field sensing element by a distance selected in accordance with a second factor times the pitch, the second factor less than the first factor, the third and fourth magnetic field sensing elements configured to generate third and fourth magnetic field signals, respectively, in response to the DC magnetic field and the ferromagnetic object;

a first differential amplifier coupled to the first and second magnetic field signals and configured to generate a first differential signal as a difference of the first and second magnetic field signals;

a second differential amplifier coupled to the third and fourth magnetic field signals and configured to generate a second differential signal as a difference of the third and fourth magnetic field signals; and an angle calculation module coupled to the first and second differential signals and configured to generate an uncorrected angle value indicative of a rotation angle of the ferromagnetic object about the rotation axis of the ferromagnetic object.

2. The system of claim 1, wherein the first factor is within fifty percent of 0.5 and the second factor is within twenty percent of 0.25.

3. The system of claim 1, wherein the angle calculation module comprises an arctangent calculation module.

4. The system of claim 3, wherein the arctangent calculation module comprises a CORDIC module.

5. The system of claim 1, wherein the magnetic field sensor further comprises:

a nonvolatile memory adapted to store a plurality of correction coefficients.

6. The system of claim 5, wherein the magnetic field sensor further comprises:

an angle correction module coupled to the uncorrected angle value, configured to select one or more of the stored plurality of correction coefficients, and configured to generate an angle correction value; and a summation module coupled to the uncorrected angle value and coupled to the angle correction value and configured to generate a corrected angle value having an accuracy improved from the uncorrected angle value.

7. The system of claim 6, wherein, as the ferromagnetic object rotates about the rotation axis, the angle calculation module is operable to generate a plurality of uncorrected angle values, the plurality of uncorrected angle values having a corresponding plurality of angle errors, the plurality of uncorrected angle errors corresponding to an uncorrected angle signal having one or more harmonics, wherein the selected one or more of the stored plurality of correction coefficients comprise respective amplitudes and phases of the one or more harmonics.

8. The system of claim 5, wherein the plurality of correction coefficients comprise a plurality of amplitude values and a plurality of phase values associated with a corresponding plurality of harmonics of an angle error associated with the uncorrected angle value.

9. The system of claim 8, wherein the magnetic field sensor further comprises:

a temperature sensor disposed upon the substrate and configured to generate a temperature signal, wherein the angle correction module comprises:

a temperature segment identification module configured to identify a temperate segment in which one of a plurality of temperature segments the temperature signal indicates, wherein the angle correction module is configured to select the one or more of the stored plurality of correction coefficients in accordance with the identified temperature segment.

10. The system of claim 9, wherein the magnetic field sensor further comprises:

an interpolation module configured to select from among the plurality correction coefficients selected ones of the correction coefficients associated with boundaries of the identified temperate segment, and configured interpolate within boundaries of the identified temperature segment to calculate interpolated correction coefficients in accordance with the selected correction coefficients, wherein the angle correction module is configured to use the interpolated correction coefficients to generate the corrected angle value.

11. The system of claim 1, further comprising:

the ferromagnetic object.

12. A method of sensing an angle of rotation of a ferromagnetic object having a rotation axis and a helical screw thread, the helical screw thread having a pitch defined by a distance between centers of two adjacent ridges to the helical screw thread, the method comprising:

generating a DC magnetic field proximate to the ferromagnetic object with a back-bias magnet;

generating first and second magnetic field signals with first and second magnetic field sensing elements, respectively, in response to the DC magnetic field and the ferromagnetic object, the first and second magnetic field sensing elements disposed proximate to the ferromagnetic object, the first and second magnetic field sensing elements having a separation selected in accordance with a first factor times the pitch;

generating third and fourth magnetic field signals third and fourth magnetic field sensing elements, respectively, in response to the DC magnetic field and the ferromagnetic object, the third and fourth magnetic field sensing elements disposed proximate to the ferromagnetic object, the third and fourth magnetic field sensing elements having a separation selected in accordance with the first factor times the pitch, the third magnetic field sensing element separated from the first magnetic field sensing element by a distance selected in accordance with a second factor times the pitch, the second factor less than the first factor;

generating a first differential signal as a difference of the first and second magnetic field signals;

generating a second differential signal as a difference of the third and fourth magnetic field signals; and using the first and second differential signals to generate an uncorrected angle value indicative of a rotation angle of the ferromagnetic object about the rotation axis of the ferromagnetic object.

13. The method of claim 12, wherein the first factor is within fifty percent of 0.5 and the second factor is within twenty percent of 0.25.

14. The method of claim 12, wherein the using the first and second differential signals comprises calculating an arctangent.

15. The method of claim 14, wherein the calculating the arctangent comprises using a CORDIC algorithm.

16. The method of claim 12, further comprising:
storing a plurality of correction coefficients in a nonvolatile memory.

17. The method of claim 16, further comprising:
selecting one or more of the stored plurality of correction coefficients;
using the selected one or more of the stored plurality of correction coefficients to generate an angle correction value; and
generating a corrected angle value having an accuracy improved from the uncorrected angle value by using the angle correction value.

18. The method of claim 17, wherein, as the ferromagnetic object rotates about the rotation axis, the method further comprises:
generating a plurality of uncorrected angle values, the plurality of uncorrected angle values having a corresponding plurality of angle errors, the plurality of uncorrected angle errors corresponding to an uncorrected angle signal having one or more harmonics, wherein the selected one or more of the stored plurality of correction coefficients comprise respective amplitudes and phases of the one or more harmonics.

19. The method of claim 16, wherein the plurality of correction coefficients comprise a plurality of amplitude values and a plurality of phase values associated with a corresponding plurality of harmonics of an angle error associated with the uncorrected angle value.

20. The method of claim 19, further comprising:
generating a temperature signal, indicative of a temperature, wherein the generating the corrected angle value comprises:
identifying a temperate segment in which one of a plurality of temperature segments the temperature signal indicates; and
selecting one or more of the stored plurality of correction coefficients in accordance with the identified temperature segment.

21. The method of claim 20, further comprising:
selecting from among the one or more of the stored plurality of correction coefficients selected ones of the correction coefficients associated with boundaries of the identified temperate segment; and
interpolating within boundaries of the identified temperature segment to calculate interpolated correction coefficients in accordance with the selected correction coefficients; and
using the interpolated correction coefficients to generate the corrected angle value.

22. A system for sensing a rotation of an angle of rotation of a ferromagnetic object having a rotation axis and a helical screw thread, the helical screw thread having a pitch defined by a distance between centers of two adjacent ridges of the helical screw thread, the system comprising a magnetic field sensor comprising:
means for generating a DC magnetic field proximate to the ferromagnetic object;
means for generating first and second magnetic field signals with first and second magnetic field sensing elements, respectively, in response to the DC magnetic field and the ferromagnetic object, the first and second magnetic field sensing elements disposed proximate to the ferromagnetic object, the first and second magnetic field sensing elements having a separation selected in accordance with a first factor times the pitch;
means for generating third and fourth magnetic field signals third and fourth magnetic field sensing elements, respectively, in response to the DC magnetic field and the ferromagnetic object, the third and fourth magnetic field sensing elements disposed proximate to the ferromagnetic object, the third and fourth magnetic field sensing elements having a separation selected in accordance with the first factor times the pitch, the third magnetic field sensing element separated from the first magnetic field sensing element by a distance selected in accordance with a second factor times the pitch, the second factor less than the first factor;
means for generating a first differential signal as a difference of the first and second magnetic field signals;
means for generating a second differential signal as a difference of the third and fourth magnetic field signals; and
means for using the first and second differential signals to generate an uncorrected angle value indicative of a rotation angle of the ferromagnetic object about the rotation axis of the ferromagnetic object.

23. The system of claim 22, wherein the first factor is within fifty percent of 0.5 and the second factor is within twenty percent of 0.25.

24. The system of claim 22, wherein means for using the first and second differential signals comprises means for calculating an arctangent.

25. The system of claim 24, wherein the means for calculating the arctangent comprises means for calculating using a CORDIC algorithm.

26. The system of claim 22, wherein the magnetic field sensor further comprises:
means for storing a plurality of correction coefficients.

27. The system of claim 26, wherein the magnetic field sensor further comprises:
means for selecting one or more of the stored plurality of correction coefficients;
means for using the selected one or more of the stored plurality of correction coefficients to generate an angle correction value; and
means for generating a corrected angle value having an accuracy improved from the uncorrected angle value by using the angle correction value.

28. The system of claim 27, further comprising:
means for generating a plurality of uncorrected angle values, the plurality of uncorrected angle values having a corresponding plurality of angle errors, the plurality of uncorrected angle errors corresponding to an uncorrected angle signal having one or more harmonics, wherein the selected one or more of the stored plurality of correction coefficients comprise respective amplitudes and phases of the one or more harmonics.

29. The system of claim 26, wherein the plurality of correction coefficients comprise a plurality of amplitude values and a plurality of phase values associated with a corresponding plurality of harmonics of an angle error associated with the uncorrected angle value.

30. The system of claim 29, wherein the magnetic field sensor further comprises:

means for generating a temperature signal, indicative of a temperature, wherein the generating the corrected angle value comprises:

means for identifying a temperate segment in which one of a plurality of temperature segments the temperature signal indicates; and means for selecting the one or more of the stored plurality of correction coefficients in accordance with the identified temperature segment.

31. The system of claim 30, wherein the magnetic field sensor further comprises:

means for selecting from among the one or more of the stored plurality of correction coefficients selected ones of the correction coefficients associated with boundaries of the identified temperate segment; and means for interpolating withing boundaries of the identified temperature segment to calculate interpolated correction coefficients in accordance with the selected correction coefficients; and means for using the interpolated correction coefficients to generate the corrected angle value.

32. The system of claim 22, further comprising:

the ferromagnetic object.

* * * * *

UNITED STATES PATENT AND TRADEMARK OFFICE
CERTIFICATE OF CORRECTION

PATENT NO. : 11,473,935 B1
APPLICATION NO. : 17/232440
DATED : October 18, 2022
INVENTOR(S) : Aurelian Diaconu et al.

It is certified that error appears in the above-identified patent and that said Letters Patent is hereby corrected as shown below:

In the Specification

Column 2, Line 38 delete "in a accordance" and replace with --in accordance--.

Column 3, Line 18 delete "signals third" and replace with --signals with third--.

Column 3, Line 51 delete "in a accordance" and replace with --in accordance--.

Column 3, Line 53 delete "signals third" and replace with --signals with third--.

Column 4, Line 48 delete "sensor" and replace with --sensors--.

Column 7, Line 2 delete "102" and replace with --102b--.

Column 7, Line 50 delete "100 and 300" and replace with --100 and 200--.

Column 7, Line 61 delete "a to a" and replace with --to a--.

Column 8, Line 33 delete "phase" and replace with --phases--.

Column 9, Line 5 delete "couped" and replace with --coupled--.

Column 9, Line 7 delete "couped" and replace with --coupled--.

Column 9, Line 34 delete "signal" and replace with --signals--.

Column 9, Line 46 delete "signal" and replace with --signals--.

Column 9, Line 49 delete "522a" and replace with --524a--.

Signed and Sealed this
Twenty-fourth Day of October, 2023

Katherine Kelly Vidal
*Director of the United States Patent and Trademark Office*

Column 10, Line 7 delete "522a" and replace with --524a--.

Column 11, Line 16 delete "134a" and replace with --548a--.

Column 11, Line 18 delete ", anI2C format" and replace with --, an I2C format--.

Column 11, Line 39 delete "signal" and replace with --signals--.

Column 12, Line 42 delete "with the with the" and replace with --with the--.

Column 13, Line 39 delete "weight," and replace with --weigh,--.

Column 13, Line 42 delete "148," and replace with --530,--.

Column 13, Line 53 delete "138" and replace with --536--.

Column 15, Line 18 delete "ultimate the" and replace with --ultimate--.

Column 15, Line 36 delete "538" and replace with --536--.

Column 15, Line 49 delete "stored four" and replace with --stored--.

Column 16, Line 27 delete "(2) Similar" and replace with --(2). Similar--.

Column 16, Line 64 delete "smaller than" and replace with --than--.

Column 17, Line 18 delete "change temperature" and replace with --change in temperature--.

Column 17, Line 49 delete ", 1002" and replace with --, 1012--.

Column 18, Line 22 delete "tin" and replace with --in--.

In the Claims

Column 20, Line 15 Claim 9, delete "temperate" and replace with --temperature--.

Column 20, Line 24 Claim 10, delete "plurality correction" and replace with --plurality of correction--.

Column 20, Line 26 Claim 10, delete "temperate" and replace with --temperature--.

Column 20, Lines 26-27 Claim 10, delete "interpolate" and replace with --to interpolate--.

Column 20, Line 50 Claim 12, delete "signals third" and replace with --signals with third--.

Column 21, Line 43 Claim 20, delete "temperate" and replace with --temperature--.

CERTIFICATE OF CORRECTION (continued)
U.S. Pat. No. 11,473,935 B1

Column 21, Line 53 Claim 21, delete "temperate" and replace with --temperature--.

Column 22, Line 10 Claim 22, delete "signals third" and replace with --signals with third--.

Column 23, Line 4 Claim 30, delete "temperate" and replace with --temperature--.

Column 23, Line 15 Claim 31, delete "temperate" and replace with --temperature--.

Column 23, Line 16 Claim 31, delete "withing" and replace with --within--.